United States Patent
Takeda

(10) Patent No.: US 12,482,508 B2
(45) Date of Patent: Nov. 25, 2025

(54) SEMICONDUCTOR DEVICE INCLUDING RESISTIVE RANDOM ACCESS NONVOLATILE MEMORY FOR INCREASING READOUT MARGIN

(71) Applicant: RENESAS ELECTRONICS CORPORATION, Tokyo (JP)

(72) Inventor: Koichi Takeda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 227 days.

(21) Appl. No.: 18/313,684

(22) Filed: May 8, 2023

(65) Prior Publication Data

US 2023/0402081 A1    Dec. 14, 2023

(30) Foreign Application Priority Data

Jun. 8, 2022  (JP) .................................. 2022-092674

(51) Int. Cl.
G11C 11/16    (2006.01)
G11C 5/08     (2006.01)
G11C 7/06     (2006.01)

(52) U.S. Cl.
CPC ............ *G11C 11/1697* (2013.01); *G11C 5/08* (2013.01); *G11C 7/06* (2013.01)

(58) Field of Classification Search
None
See application file for complete search history.

(56) References Cited

U.S. PATENT DOCUMENTS

| | | | | |
|---|---|---|---|---|
| 5,563,820 A | * | 10/1996 | Wada ................... | G11C 29/804 |
| | | | | 257/E27.098 |
| 6,741,490 B2 | * | 5/2004 | Baker ................... | G11C 7/062 |
| | | | | 365/158 |
| 6,791,859 B2 | * | 9/2004 | Hush .................... | G11C 13/004 |
| | | | | 365/204 |
| 9,384,792 B2 | * | 7/2016 | Bonaccio ............. | G11C 29/026 |
| 2001/0048608 A1 | * | 12/2001 | Numata .............. | G11C 11/1657 |
| | | | | 365/158 |

OTHER PUBLICATIONS

Yu-Der Chih et al., "13.3 A 22nm 32Mb Embedded STT-MRAM with 10ns Read Speed, 1M Cycle Write Endurance, 10 Years Retention at 150°C and High Immunity to Magnetic Field Interference", 2020 ISSCC, pp. 222-224.

* cited by examiner

Primary Examiner — Richard Elms
Assistant Examiner — Rose Agger
(74) Attorney, Agent, or Firm — Rimon P.C.

(57) ABSTRACT

A semiconductor device capable of increasing readout margin in a nonvolatile resistive random access memory is provided. A clamping circuit applies fixed potential to each of a memory element and a reference resistive element. A pre-charge circuit pre-charges first and second nodes to power-source potential. A sense amplifier amplifies the potential difference between the potential of the first node and the potential of the second node generated after a discharge period based on cell current and reference current after pre-charging made by the pre-charge circuit. A third node is coupled to the first and second nodes through a capacitor. An electric-charge supply circuit is connected to the third node, and supplies electric charge to the third node in the discharge period.

13 Claims, 15 Drawing Sheets

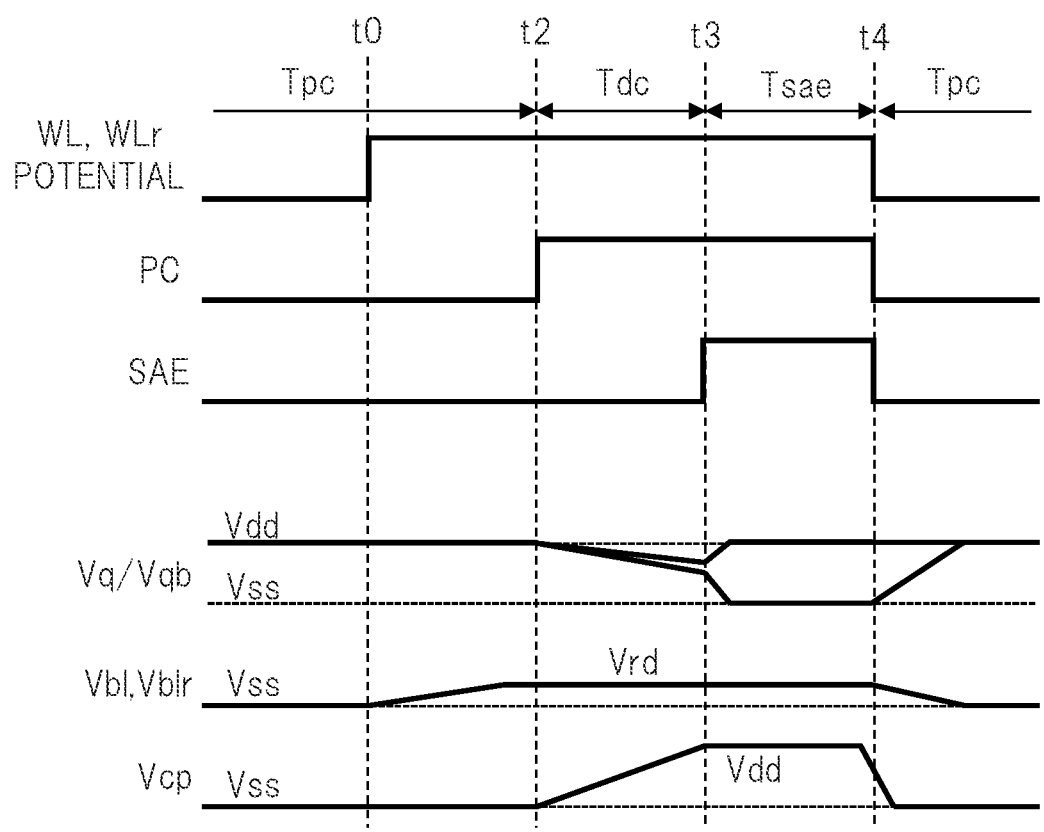

SEMICONDUCTOR DEVICE INCLUDING RESISTIVE RANDOM ACCESS NONVOLATILE MEMORY FOR INCREASING READOUT MARGIN

CROSS-REFERENCE TO RELATED APPLICATION

The present application claims priority from Japanese Patent Application No. 2022-092674 filed on Jun. 8, 2022, the content of which is hereby incorporated by reference into this application.

BACKGROUND

The present invention relates to a semiconductor device, and relates to, for example, a semiconductor device including a resistive random access memory element such as a magnetoresistive random access memory (MRAM).

There is disclosed techniques listed below.

[Non-Patent Document 1] Yu-Der Chih et al., "13.3 A 22 nm 32 Mb Embedded STT-MRAM with 10 ns Read Speed, 1M Cycle Write Endurance, 10 Years Retention at 150° C. and High Immunity to Magnetic Field Interference", 2020 ISSCC, pp. 222-224

For example, the Non-Patent Document 1 describes an exemplary configuration of a readout circuit in spin transfer torque (STT)-MRAM. The readout circuit includes: a clamping element that applies readout potential to a cell resistor and a reference resistor; a sense amplifier of a p-MOS cross-coupled type; and a pre-charge element that pre-charges differential-pair nodes of the sense amplifier. The sense amplifier amplifies the potential difference between the differential-pair nodes that are pre-charged, and then, are discharged through the cell resistor and the reference resistor.

SUMMARY

In recent years, MRAM, more specifically STT-MRAM, has attracted attention as an internal memory in a semiconductor device such as a micro controller unit (MCU) or a system on a chip (SoC). For example, the STT-MRAM provides a merit in a viewpoint of miniaturization, in other words, in a viewpoint of scaling or others more than a related-art MRAM or flash memory. Meanwhile, advance of the miniaturization generally reduces a breakdown voltage of a transistor, and therefore, a low power-source potential is used. However, use of the low power-source potential causes a risk of failure to sufficiently secure a readout margin.

Other objects and novel characteristics of the present invention will be apparent from the description of the present specification and the accompanying drawings.

A semiconductor device according to an embodiment includes: a memory cell including a resistive random access memory element; a reference resistive element; a clamping circuit; first, second and third wirings; a pre-charge circuit; a sense amplifier; and an electric-charge supply circuit. In the clamping circuit, a fixed potential is applied to each of the memory element and the reference resistive element. Cell current that is generated by application of the fixed potential to the memory element flows through the first wiring. Reference current that is generated by application of the fixed potential to the reference resistive element flows through the second wiring. The pre-charge circuit pre-charges the first wiring and the second wiring to the power-source potential. The sense amplifier amplifies the potential difference between the potential of the first wiring and the potential of the second wiring, the potential difference being generated after a discharge period based on the cell current and the reference current after the pre-charging made by the pre-charge circuit. The third wiring is coupled to each of the first wiring and the second wiring through a capacitor. The electric-charge supply circuit is connected to the third wiring, and supplies electric charge to the third wiring in the discharge period.

By use of the semiconductor device according to the embodiment, a readout margin in a resistive random access nonvolatile memory can be increased.

BRIEF DESCRIPTIONS OF THE DRAWINGS

FIG. 8 is a timing chart of an exemplary operation in a readout cycle in FIGS. 2A and 7.

DETAILED DESCRIPTION

Figure 1:
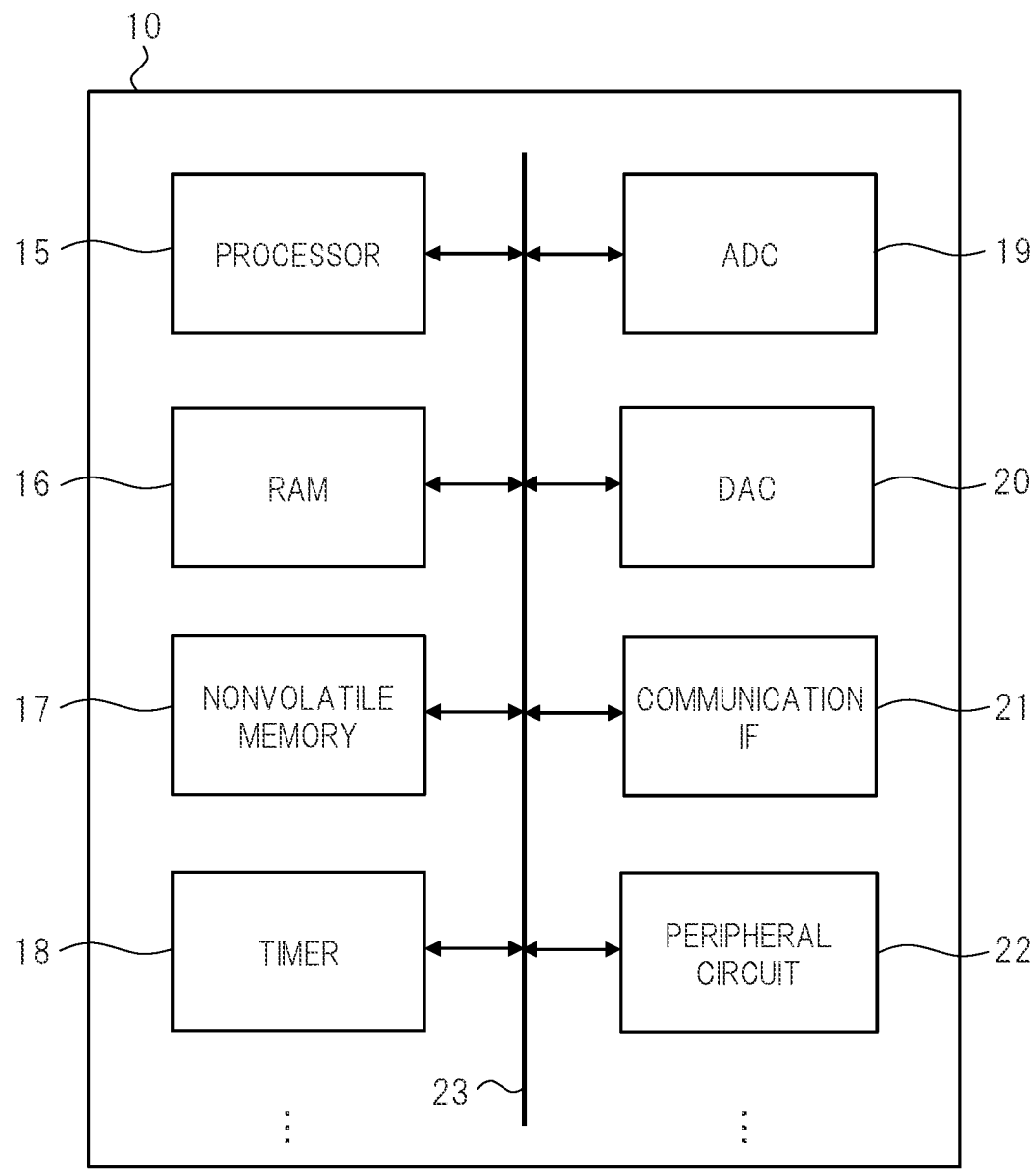
FIG. 1 is a block diagram of an exemplary configuration of a principal part of a semiconductor device according to a first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Although not particularly limited, a circuit element configuring each functional block in the embodiments is formed on a semiconductor substrate as being of single-crystal silicon by a publicly known integrated-circuit technique such as a complementary MOS transistor (CMOS). In the embodiments, as an example of a metal insulator semiconductor field effect transistor (MISFET), a metal oxide semiconductor field effect transistor (MOSFET), simply referred to as MOS transistor, is used. However, a non-oxide film is not excluded as a gate insulator film. In the embodiments, a p-channel MOSFET is called a pMOS transistor "MP", and an n-channel MOSFET is called an nMOS transistor "MN". In the drawings, the connection of a MOS transistor to substrate potential is not particularly illustrated. However, a method for the connection is not particularly limited if the MOS transistor is normally operable.

Hereinafter, the embodiments will be described in detail with reference to the accompanying drawings. Note that components having the same function are denoted by the same reference signs throughout all the drawings for describing the embodiments, and the repetitive description thereof will be omitted. In addition, the description of the same or similar portions is not repeated in principle unless otherwise particularly required in the following embodiments.

First Embodiment (Outline of Semiconductor Device and Nonvolatile Memory)

FIG. 1 is a block diagram of an exemplary configuration of a principal part of a semiconductor device according to a first embodiment. The semiconductor device 10 illustrated in FIG. 1 is made of a single semiconductor chip such as an MCU or an SoC. The semiconductor device 10 can be mounted on, for example, an electronic control unit (ECU) of a vehicle or others.

The semiconductor device 10 illustrated in FIG. 1 includes a processor 15, a RAM 16, a nonvolatile memory 17, a timer 18, an analog/digital converter (ADC) 19, a digital/analog converter (DAC) 20, a communication interface 21, various peripheral circuits 22, and a bus 23 connecting these constituent elements. The processor 15 is a central processing unit (CPU), a graphics processing unit (GPU) or others. The RAM 16 is a volatile memory such as DRAM or SRAM.

The communication interface 21 may be, for example, a controller area network (CAN) interface or others. The nonvolatile memory 17 is, for example, STT-MRAM or others. In some cases, the nonvolatile memory 17 is used for storage of a program to be executed by the processor 15 or is used as a work memory for the processor 15. Note that the nonvolatile memory 17 is not limited to the MRAM but is only required to include a resistive random access memory element.

In this case, for example, when the STT-MRAM or others is used as the nonvolatile memory 17, the miniaturization of the semiconductor device 10 is easily supported. Meanwhile, the advance of the miniaturization may reduce the readout margin, more specifically reduce a signal amount or others provided from a memory element since a low power-source potential is used. In particular, regarding the semiconductor device 10 for a vehicle or others, a change amount of a resistance value of the memory element may be reduced under a high temperature environment. This can lead to the reduction in the readout margin. Thus, a technique for an improvement in the readout margin is required.

Figure 2A:
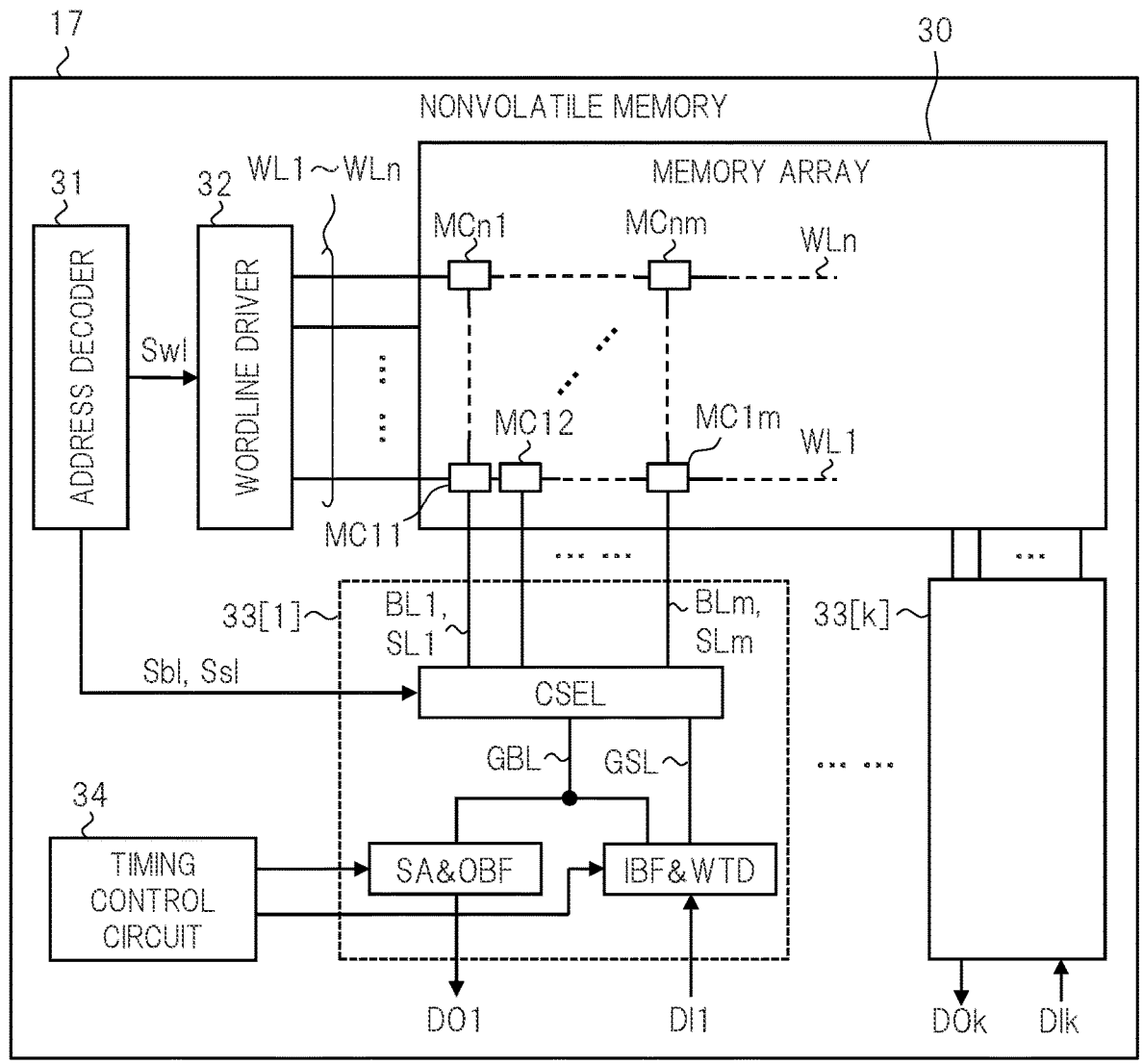
FIG. 2A is a block diagram of an exemplary configuration of a principal part of a nonvolatile memory in FIG. 1.
Figure 2B:
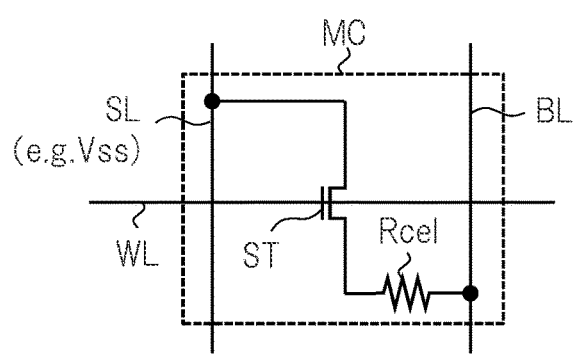
FIG. 2B is a circuit diagram of an exemplary configuration of a memory cell in FIG. 2A.

FIG. 2A is a block diagram of an exemplary configuration of a principal part of the nonvolatile memory in FIG. 1. FIG. 2B is a circuit diagram of an exemplary configuration of a memory cell in FIG. 2A. The nonvolatile memory 17 illustrated in FIG. 2A includes a memory array 30, a word line driver 32, a plurality of, that is "k", read/write circuits 33[1] to 33[k], an address decoder 31, and a timing control circuit 34.

The memory array 30 includes a plurality of, that is "n", word lines WL1 to WLn. The memory array 30 includes a plurality of, that is "m", bit lines BL1 to BLm, "m" source lines SL1 to SLm, and a plurality of, that is "(n×m)" memory cells MC11 to MCnm so as to correspond to one read/write circuit such as the read/write circuit 33[1]. In the specification, the plurality of word lines WL1 to WLn are collectively called word lines WL. The plurality of bit lines BL1 to BLm are collectively called bit lines BL. The plurality of source lines SL1 to SLm are collectively called source lines SL. The plurality of memory cells MC11 to MCnm are collectively called memory cells MC.

Note that the writing "m" source lines SL1 to SLm are provided to correspond to the "m" bit lines BL1 to BLm. Note that, in some cases, two memory cells MC share a single source line for high density. The number of source lines to be provided in such a case is expressed as "m/2". Although not illustrated, "(m×k)" bit lines BL and "(n×m×k)" memory cells MC are specifically provided to correspond to the "k" read/write circuits 33[1] to 33[k].

The plurality of word lines WL1 to WLn are disposed side by side in a row direction, and extends in a column direction intersecting, for example, being orthogonal to the row direction. Meanwhile, the plurality of bit lines BL1 to BLm are disposed side by side in the column direction, and extends in the row direction. The plurality of memory cells MC are disposed at respective intersections between the plurality of word lines WL and the plurality of bit lines BL. For example, the memory cell MCnm is disposed at the intersection between the word line WLn and the bit line BLm.

As illustrated in FIG. 2B, the memory cell MC includes a resistive random access memory element Rcel and a selection transistor ST connected in series between the bit line BL and the source line SL. The memory element Rcel is connected to the bit line BL, and stores data that is different between a low resistance state and a high resistance state of a magnetic tunnel junction (MTJ) as a constituent element. Specifically, the MTJ includes a fixed layer and a free layer interposing a tunnel barrier film therebetween. The direction of magnetization of the free layer varies depending on the direction of current at the time of write operation. A state where the fixed layer and the free layer are identical to each other in the direction of magnetization is called a "P" state. A state where the fixed layer and the free layer are opposite to each other in the direction of magnetization is called an "AP" state. The P state corresponds to the low resistance state. The AP state corresponds to the high resistance state.

The selection transistor ST is, for example, an nMOS transistor and is connected between the source line SL and the memory element Rcel. A control node that is a gate of the selection transistor ST is connected to a word line WL, and the selection transistor ST is controlled ON or OFF by the word line WL.

In order to change the memory element Rcel from the AP state as the high resistance state to the P state as the low resistance state, a positive potential based on the source line SL is applied to the bit line BL in the ON state of the selection transistor ST to make a flow of write current from the bit line BL to a ground potential Vss through the memory element Rcel. Meanwhile, in order to change the memory element Rcel from the P state to the AP state, a negative potential based on the source line SL is applied to the bit line BL in the ON state of the selection transistor ST to make a flow of write current from the source line SL to the bit line BL through the memory element Rcel.

At the time of readout operation, a magnitude of cell current flowing through the memory element Rcel is determined in a state in which the ground potential Vss is applied to the source line SL to apply a potential lower than that at the time of write operation to the memory element Rcel although described in detail below. In this case, for example, a reference resistive element having intermediate resistance between the resistance in the AP state and the resistance in the P state is previously provided, and the cell current flowing through the memory element Rcel is compared with reference current flowing through this reference resistive element.

Referring back to FIG. 2A, based on a selection signal Swl output from the address decoder 31, the word line driver 32 selects any one word line WL from the plurality of word lines WL1 to WLn, and applies potential to the selected word line WL in order to control the selection transistor ST to be ON. The read/write circuit 33[1] as a representative of the plurality of read/write circuits 33[1] to 33[k] includes a column selector CSEL, a readout circuit, and a write circuit. The readout circuit includes a sense amplifier SA and an output buffer OBF. The write circuit includes an input buffer IBF and a write driver WTD.

At the time of readout operation, based on a selection signal Sbl output from the address decoder 31, the column selector CSEL selects any one bit line BL from the "m" bit lines BL. The column selector CSEL connects the selected one bit line BL to a global bit line GBL. The sense amplifier SA amplifies the difference between the current flowing through the global bit line GBL that is the cell current flowing through the selected memory cell MC and the reference current flowing through the reference resistive element described above. The output buffer OBF outputs a latch result as readout data DO1 outward by latching an output signal of the sense amplifier SA.

Meanwhile, at the time of write operation, based on selection signals Sbl and Ssl output from the address decoder 31, the column selector CSEL selects each one of the "m" bit lines BL and the "m" source lines SL. The column selector CSEL connects the selected one bit line BL and one source line SL to the global bit line GBL and a global source line GSL, respectively.

The input buffer IBF latches write data DI1 input from outside. Based on the logic level of the data latched by the input buffer IBF, the write driver WTD writes the P state or the AP state into the selected memory cell MC through the global bit line GBL and the global source line GSL. That is, the write driver WTD generates write current or write potential corresponding to the P state or the AP state, and applies the write current or write potential to the global bit line GBL and the global source line GSL.

The read/write circuits 33[2] to 33[k] each have a configuration similar to the configuration of the read/write circuit 33[1], and operate as similar to the read/write circuit 33[1]. As a result, the read/write circuits 33[2] to 33[k] output, as the respective readout data DO2 to DOk, the data stored in the selected memory cell MC on the same word line WL. Into the selected memory cell MC, the read/write circuits 33[2] to 33[k] write the respective write data DI2 to DIk input from outside.

The timing control circuit 34 controls various entire timing of the nonvolatile memory 17. As a part of this, the timing control circuit 34 controls the timing of activations of the sense amplifier SA and the write driver WTD, the timing of latching of the output buffer OBF and the input buffer IBF and others. In the specification, note that the read/write circuits 33[1] to 33[k] are collectively called read/write circuits 33. The readout data DO1 to DOk is collectively called readout data DO. The write data DI1 to DIk is collectively called write data DI.

(Basic System of Readout Circuit)
(System of Comparative Example and Problems Thereof)

Figure 14:
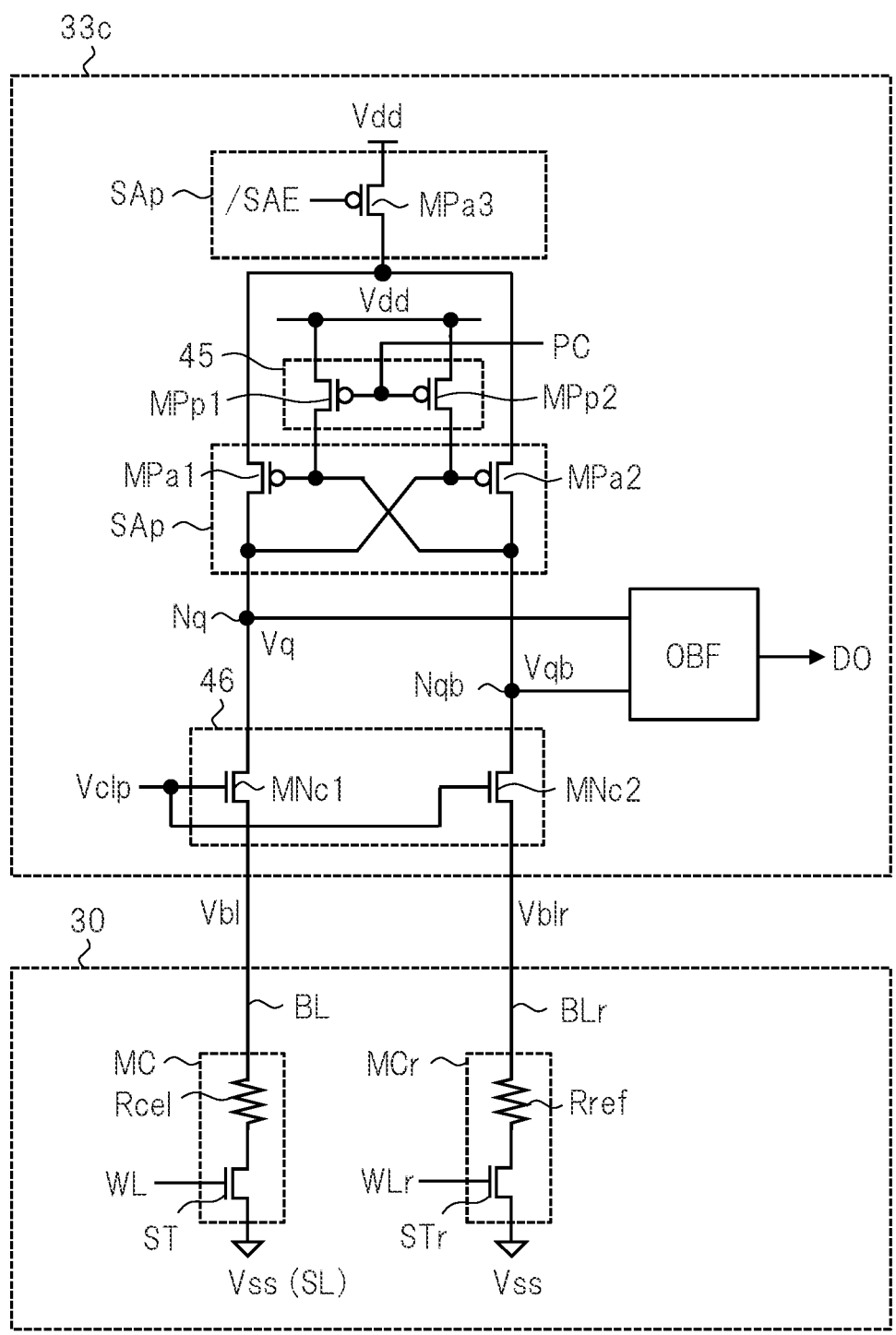
FIG. 14 is a circuit diagram of an exemplary detailed configuration of a principal part of a readout circuit in a semiconductor device according to a comparative example.

FIG. 14 is a circuit diagram of an exemplary detailed configuration of a principal part of a readout circuit in a semiconductor device according to a comparative example. FIG. 14 illustrates a part of a memory array 30 and a part of the read/write circuit 33 shown in FIG. 2A. Although not illustrated, a column selector CSEL is connected between a part of the memory array 30 and a part of the read/write circuit 33. At the time of readout operation of a memory cell MC, ground potential Vss is applied to a source line SL.

In FIG. 14, the memory array 30 includes a reference memory cell MCr in addition to the standard memory cell MC. In FIG. 2A, illustration of the reference memory cell MCr is omitted. As illustrated in FIG. 2B, the standard memory cell MC includes a resistive random access memory element Rcel and a selection transistor ST to be controlled by a word line WL.

Meanwhile, the reference memory cell MCr includes a reference resistive element Rref and a reference selection transistor STr. The reference resistive element Rref has intermediate resistance between the resistance in the P state and the resistance in the AP state. The reference selection transistor STr is controlled by a reference word line WLr. At the time of readout operation, not only the word line WL but also the reference word line WLr are activated. As a result, cell current corresponding to the resistance of the memory element Rcel flows through a bit line BL, and reference current corresponding to the resistance of the reference resistive element Rref flows through a reference bit line BLr. Note that FIG. 14 illustrates an example of arrangement of the reference memory cell MCr in the memory array 30. However, depending on a memory configuration, the reference memory cell MCr may be disposed in the read/write circuit 33.

A read/write circuit 33c includes a sense amplifier SAp, a pre-charge circuit 45, a clamping circuit 46, and an output buffer OBF. The clamping circuit 46 includes two nMOS transistors MNc1 and MNc2 each functioning as a source-follower clamping element. At the time of readout operation, the clamping circuit 46 applies fixed potential to the memory element Rcel and the reference resistive element Rref, respectively, through the bit line BL and the reference bit line BLr. The fixed potential in this case is determined by clamping potential Vclp applied to the gates of the nMOS transistors MNc1 and MNc2.

The drain of the nMOS transistor MNc1 is connected to a node (first wiring) Nq, and the drain of the nMOS transistor MNc2 is connected to a node (second wiring) Nqb. Due to application of the fixed potential from the clamping circuit 46 to the memory element Rcel, cell current flows through the node Nq. By the application of the fixed potential from the clamping circuit 46 to the reference resistive element Rref, reference current is flown through the node Nqb.

The pre-charge circuit 45 includes two pMOS transistors MPp1 and MPp2 each having its source to which power-source potential Vdd is applied. The pre-charge circuit 45 pre-charges the nodes Nq and Nqb to the power-source potential Vdd. Specifically, the pMOS transistors MPp1 and MPp2 are turned ON in a low-level period of a pre-charge signal PC to pre-charge the nodes Nqb and Nq connected to the drain.

The sense amplifier SAp includes a p-channel transistor pair made of two pMOS transistors MPa1 and MPa2 and a pMOS transistor MPa3. After the pre-charging made by the pre-charge circuit 45, the sense amplifier SAp amplifies the potential difference between the potential Vq of the node Nq and the potential Vqb of the node Nqb generated after the discharge period based on the cell current and the reference current.

Specifically, the gates of the pMOS transistors MPa1 and MPa2 are connected to the nodes Nqb and Nq, respectively. The pMOS transistors MPa1 and MPa2 perform differential amplification in cross-coupled connection that is connection of the gate of one of the pMOS transistors MPa1 and MPa2 to the drain of the other. That is, the pMOS transistors MPa1 and MPa2 serve as a pMOS cross-coupled sense amplifier. The pMOS transistor MPa3 applies the power-source potential Vdd to the sources of the pMOS transistors MPa1 and MPa2 in a high-level period of a sense-amplifier enable signal SAE. Thus, the pMOS transistor MPa3 activates the sense amplifier SAp.

The output buffer OBF further amplifies and latches the potential difference between the potential Vq and the potential Vqb amplified by the sense amplifier SAp. Then, the output buffer OBF outputs latched data as the readout data DO. Note that the pre-charge signal PC and the sense-amplifier enable signal SAE are generated by the timing control circuit 34 as illustrated in FIG. 2A.

Figure 15A:
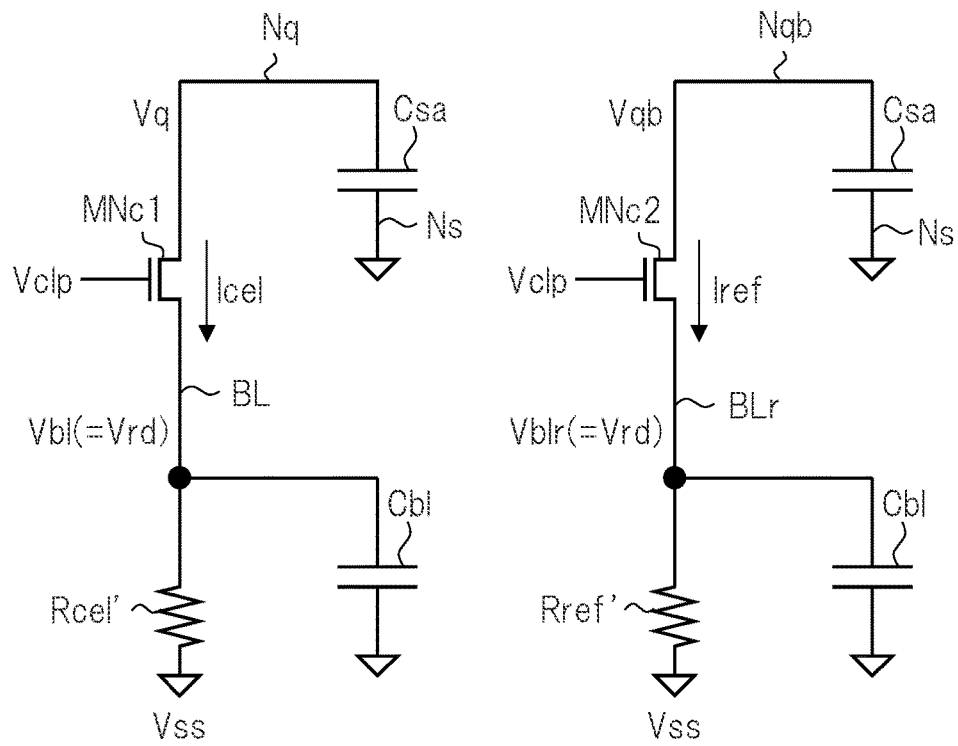
FIG. 15A is an equivalent circuit diagram simply illustrating a state at the time of readout operation of the circuit illustrated in FIG. 14.
Figure 15B:
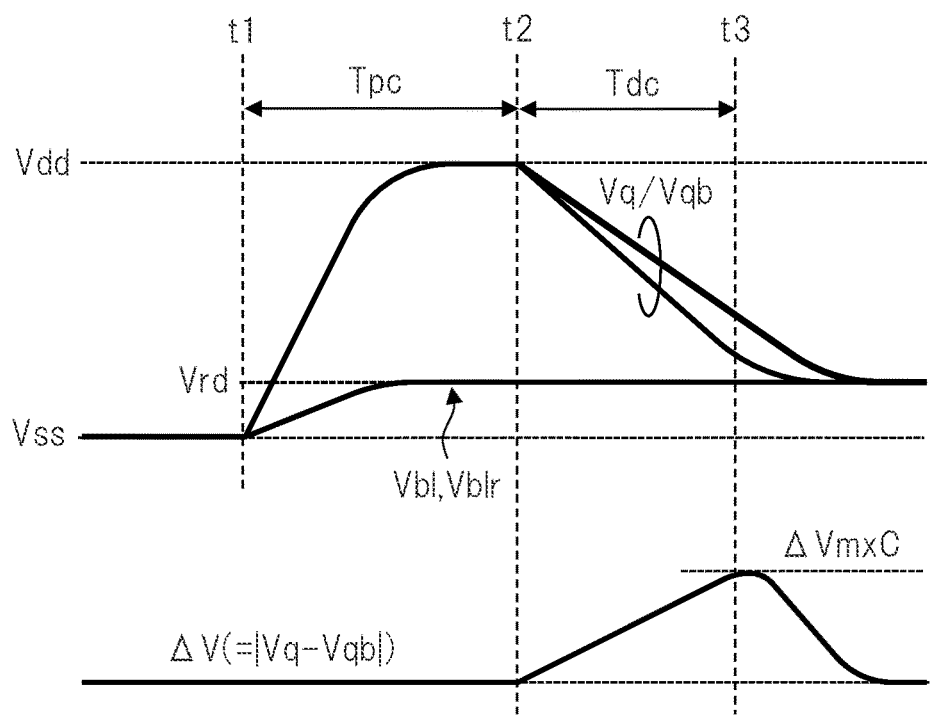
FIG. 15B is a waveform chart of an exemplary operation of the circuits illustrated in FIGS. 14 and 15A.

FIG. 15A is an equivalent circuit diagram simply illustrating a state at the time of readout operation of the circuit illustrated in FIG. 14. FIG. 15B is a waveform chart of an exemplary operation of the circuits illustrated in FIGS. 14 and 15A. FIG. 15A illustrates a state where cell current Icel is flown through the bit line BL and the node Nq by application of readout potential Vrd to a combined resistance Rcel' of the memory element Rcel and the selection transistor ST through the bit line BL. The readout potential Vrd is fixed potential based on the clamping potential Vclp. Similarly, the drawing illustrates a state where reference current Iref is flown through the reference bit line BLr and the node Nqb by application of the readout potential Vrd to a combined resistance Rref of the reference resistive element Rref and the selection transistor STr through the reference bit line BLr.

In this case, more specifically, the nodes Nq and Nqb are each coupled through a capacitor Csa to a node Ns to which the ground potential Vss is applied. The capacitor Csa is a parasitic capacitor existing between the node (first wiring) Nq and wiring for the ground potential Vss and existing between the node (second wiring) Nqb and wiring for the ground potential Vss. Similarly, the bit line BL and the reference bit line BLr are each coupled through a capacitor Cbl that is a parasitic capacitor to the ground potential Vss.

At the time of readout operation, as illustrated in FIG. 15B, in the pre-charge period Tpc from time t1 to time t2, the pre-charge circuit 45 pre-charges the potentials Vq and Vqb of the nodes Nq and Nqb to the power-source potential Vdd. The power-source potential Vdd is, for example, 0.7 V that is equal to or less more than 1.0 V. The memory element Rcel in the memory cell MC is brought into a selected state, and is connected to the node Nq through the clamping circuit 46 (MNc1). Accordingly, a current path is formed from the pre-charge circuit 45 to the memory element Rcel, and the potential Vbl of the bit line BL is clamped at the readout potential Vrd. The cell current Icel flows corresponding to the readout potential Vrd and the resistance of the memory element Rcel, more specifically the combined resistance Rcel'.

Similarly, the reference resistive element Rref in the reference memory cell MCr is also brought into a selected state, and is connected to the node Nqb through the clamping circuit 46 (MNc2). Accordingly, a current path is formed from the pre-charge circuit 45 to the reference resistive element Rref, and the potential Vblr of the reference bit line BLr is clamped at the readout potential Vrd. The reference current Iref flows corresponding to the readout potential Vrd and the resistance of the reference resistive element Rref, more specifically the combined resistance Rref'. The readout potential Vrd is, for example, 0.1 V or others.

After that, in the discharge period Tdc from time t2 to time t3, the pre-charge circuit 45 is brought into a stop state. By the discharging made by the cell current Icel and the reference current Iref, the potentials Vq and Vqb of the nodes Nq and Nqb are decreased from the power-source potential Vdd that is the pre-charge level. In this case, the discharge gradient of the potential Vq is determined by a scale of the cell current Icel, and the discharge gradient of the potential Vqb is determined by a scale of the reference current Iref. By the difference between the gradients, the potential difference ΔV between the potential Vq and the potential Vqb is increased in time course. The sense amplifier SAp is activated at the time of a sufficiently large potential difference ΔV such as time t3 to amplify the potential difference ΔV at time t3.

However, such a system causes a risk of an insufficient readout margin, more specifically an insufficient potential difference ΔV at the time of the activation of the sense amplifier SAp. That is, for example, the potential difference ΔV at time t3 is required to be larger than the offset voltage of the sense amplifier SAp. If the potential difference ΔV is smaller than the offset voltage of the sense amplifier SAp, there is a risk of inverse amplification performed by the sense amplifier SAp or latching of wrong data by the output buffer OBF at the subsequent stage because of a shortage of an amplification amount of the sense amplifier SAp.

The potential difference ΔV will be described in detail here. As illustrated in FIG. 15B, the potential difference ΔV reaches the maximum value ΔVmxC at time t3 and then decreases. In specific explanation, the discharge gradient Vq/t of the potential Vq after time t2 is expressed as "Icel/Csa" based on the capacitance value of the capacitor Csa illustrated in FIG. 15A. The discharge gradient Vqb/t of the potential Vqb is similarly expressed as "Iref/Csa". Thus, as indicated in Expression (1), the potential difference "ΔV=Vq−Vqb" gradually increases in course of time "t".

$$\Delta V = (Icel - Iref) \times t / Csa \qquad (1)$$

Note that, for example, when the node Nq is discharged to close to the readout potential Vrd after a certain period of time, the operation region of the clamping nMOS transistor MNc1 is close to a linear region. Thus, the discharge gradient Vq/t of the potential Vq is mainly determined by the capacitance value of the capacitor Cbl of the bit line BL illustrated in FIG. That is, the discharge gradient Vq/t of the potential Vq in this case is expressed as, for example, "Icel/(Csa+Cbl)", and a relation of "Cbl>>Csa" is established because of the difference in the length of wiring. Thus, the discharge gradient of the potential Vq dramatically reduces.

Meanwhile, the node Nqb is not discharged to close to the readout potential Vrd in comparison to the node Nq, and thus the discharge gradient of the potential Vqb remains at Iref/Csa. From these results, the potential difference ΔV reaches the maximum value ΔVmxC at time t3 at which one of the nodes Nq and Nqb is discharged to close to the readout potential Vrd, and then, rapidly decreases. Thus, it is desirable to activate the sense amplifier SAp at time t3 at which the potential difference ΔV reaches the maximum value ΔVmxC.

However, as illustrated in FIG. 2A, in the nonvolatile memory 17, it is necessary to simultaneously activate "k" sense amplifiers SA. In this case, it is not easy to match the timings of the activation of all the "k" sense amplifiers SA with the time t3 of the maximum value ΔVmxC in consideration of the difference between the AP state and the P state, a characteristic variation of each sense amplifier SA, and others. In this case, even if any of the sense amplifiers SA satisfies the requirement for the potential difference ΔV, another sense amplifier SA may have difficulty in satisfying the requirement.

Thus, in order to increase the readout margin in consideration of such unmatching in the timing of activation, it is desirable to increase the potential difference ΔV itself to a certain extent. According to the present inventors' study or others, it is found out that the maximum value ΔVmxC of the potential difference ΔV is expressed as, for example, a relation in Expression (2). In the Expression (2), "ΔMRratio" is expressed as "(Rcel−Rref)/Rref" based on the respective resistances of the memory element Rcel and the reference resistive element Rref. A term "Vpc" represents pre-charge potential made by the pre-charge circuit 45. A term "Vdc" represents discharge lower-limit potential, and is almost equivalent in value to the readout potential Vrd.

$$\Delta VmxC = \Delta MRratio \times (Vpc - Vdc) \qquad (2)$$

If the ΔMRratio is large, the difference between the cell current Icel and the reference current Iref is large, and therefore, the maximum value ΔVmxC can be made large. If the value of "Vpc−Vdc" is large, more specifically if the pre-charge potential Vpc is high, the discharge period Tdc in FIG. 15B can be mainly lengthened, and therefore, the maximum value ΔVmxC can be made large by the lengthening.

In this case, the "ΔMRratio" is mainly determined by the physical structure of the memory element Rcel or others. Thus, it is not easy to increase the ΔMRratio. The ΔMRratio actually tends to decrease in consideration of various temperature environments. On the other hand, the pre-charge potential Vpc is a design parameter that is variable to some extent. However, in order to increase the pre-charge potential Vpc, it is typically necessary to use a transistor having a high breakdown voltage. In this case, such a transistor is disadvantageous in the miniaturization or the low power consumption of the semiconductor device 10. Thus, it is effective to use a system according to the following embodiment.

System of Embodiment

Figure 3:
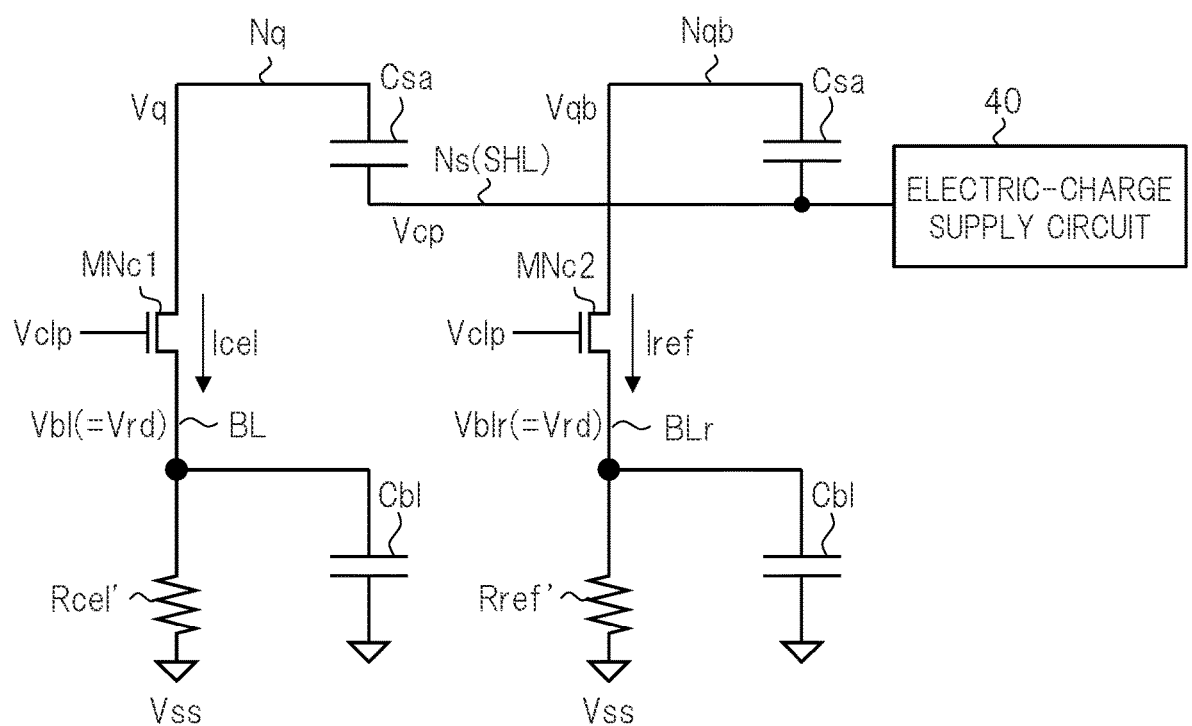
FIG. 3 is an equivalent circuit diagram simply illustrating a state at the time of readout operation in the nonvolatile memory illustrated in FIG. 2A.
Figure 4A:
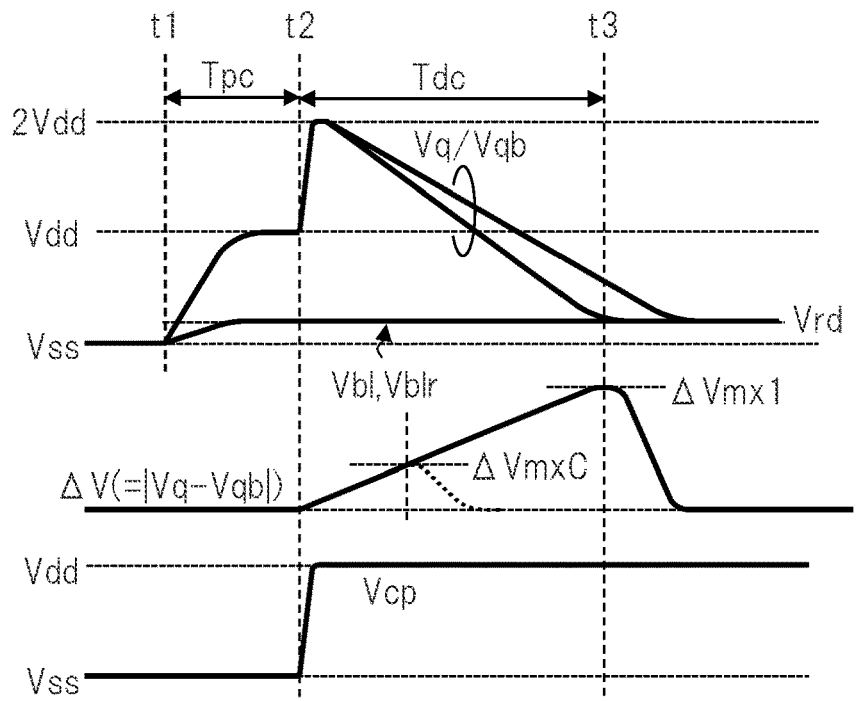
FIG. 4A is a waveform chart of an exemplary operation of the circuit illustrated in FIG. 3.
Figure 4B:
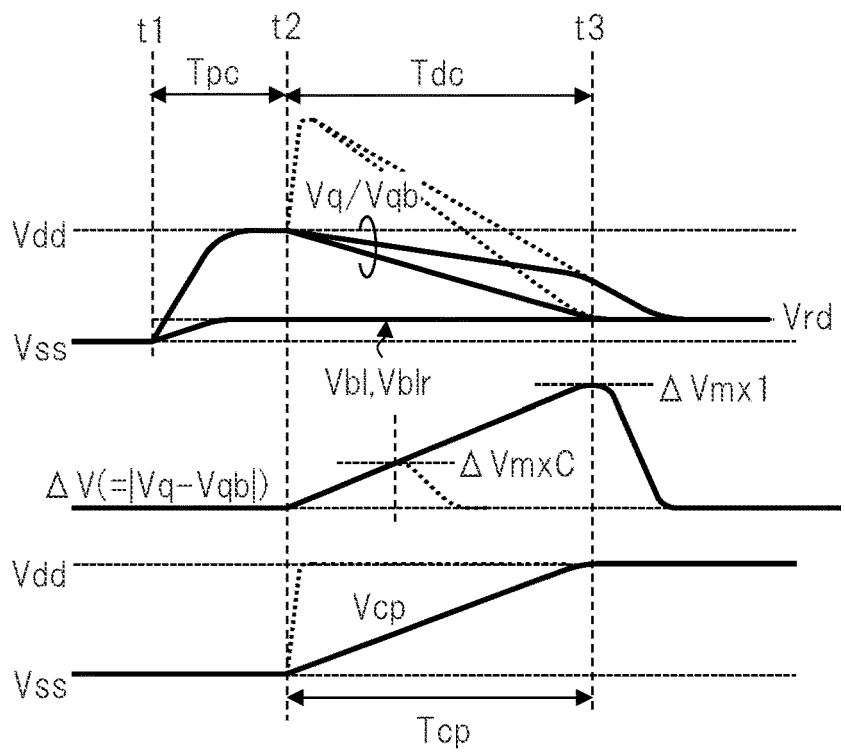
FIG. 4B is a waveform chart of another exemplary operation of the circuit illustrated in FIG. 3.

FIG. 3 is an equivalent circuit diagram simply illustrating a state at the time of readout operation in the nonvolatile memory illustrated in FIG. 2A. FIGS. 4A and 4B are waveform charts of exemplary operations of a circuit illustrated in FIG. 3. FIG. 3 illustrates an equivalent circuit similar to the circuit illustrated in FIG. 15A. However, in FIG. 3, an electric-charge supply circuit 40 is added as different from the case of FIG. 15A.

The electric-charge supply circuit 40 is connected to a node Ns that is one end of the capacitor Csa, and supplies electric charge to the node Ns in the discharge period Tdc as illustrated in FIG. 15B. In other words, the electric-charge supply circuit 40 rises the potentials Vq and Vqb of the nodes Nq and Nqb through the capacitor Csa by charging the node Ns to increase the potential Vcp of the node Ns. Note that the node Ns specifically corresponds to, for example, a shielded line (third wiring) SHL.

As similar to the case of FIG. 15B, FIG. 4A illustrates the operation waveform in the pre-charge period Tpc from time t1 to time t2 and the operation waveform in the discharge period Tdc from time t2 to time t3. However, as different from the case of FIG. 15B, in FIG. 4A, the electric-charge supply circuit 40 increases the potential Vcp of the node Ns from ground potential Vss to power-source potential Vdd at time t2. In response to this, at near time t2, the potentials Vd and Vqb of the nodes Nq and Nqb rise from the power-source potential Vdd that is the pre-charge potential to a potential of "2×Vdd".

As a result, as illustrated in FIG. 4A, the discharge period Tdc can be lengthened to some extent, and the maximum value ΔVmx1 of the potential difference ΔV between the potential Vq and the potential Vqb can be made larger than the maximum value ΔVmxC illustrated in FIG. Specifically, the maximum value ΔVmx1 can be about twice to three times as large as the maximum value ΔVmxC. Ideally, the sense amplifier SA is activated at time t3 with the maximum value ΔVmx1. Note that the timing of activation in practice may be time slightly earlier than time t3 in consideration of characteristic variations among the plurality of sense amplifiers SA.

However, in the operation example of FIG. 4A, it is necessary to use the transistor having the high breakdown voltage because of the application of the potential of "2×Vdd" to the nodes Nq and Nqb. Thus, it is effective to use such an operation example as illustrated in FIG. 4B. As different from the case of FIG. 4A, in FIG. 4B, the electric-charge supply circuit 40 charges the node Ns from the ground potential Vss on the low-potential side to the power-source potential Vdd on the high-potential side during the discharge period Tdc from time t2 to time t3. That is, a charge period Tcp identical in length to the discharge period Tdc is provided.

Thus, as illustrated in FIG. 4B, the maximum value ΔVmx1 equivalent to that in FIG. 4A is acquired as the potential difference ΔV at time t3. Furthermore, the electric-charge supply circuit 40 gradually charges the node Ns, and thus, gradually rises the potential Vq and the potential Vqb during the charge period Tcp, in other words, the discharge period Tdc. Thus, the potentials Vq and Vqb of the nodes Nq and Nqb are controlled not to exceed, for example, the power-source potential Vdd. As a result, it is possible to increase the potential difference ΔV that is the readout margin while using the transistor having the low breakdown voltage. Note that the upper limits of the potentials Vq and Vqb are not limited to the power-source potential Vdd, and may be appropriately determined in accordance with the breakdown voltage of the transistor.

(Detail of Readout Circuit)

Figure 5:
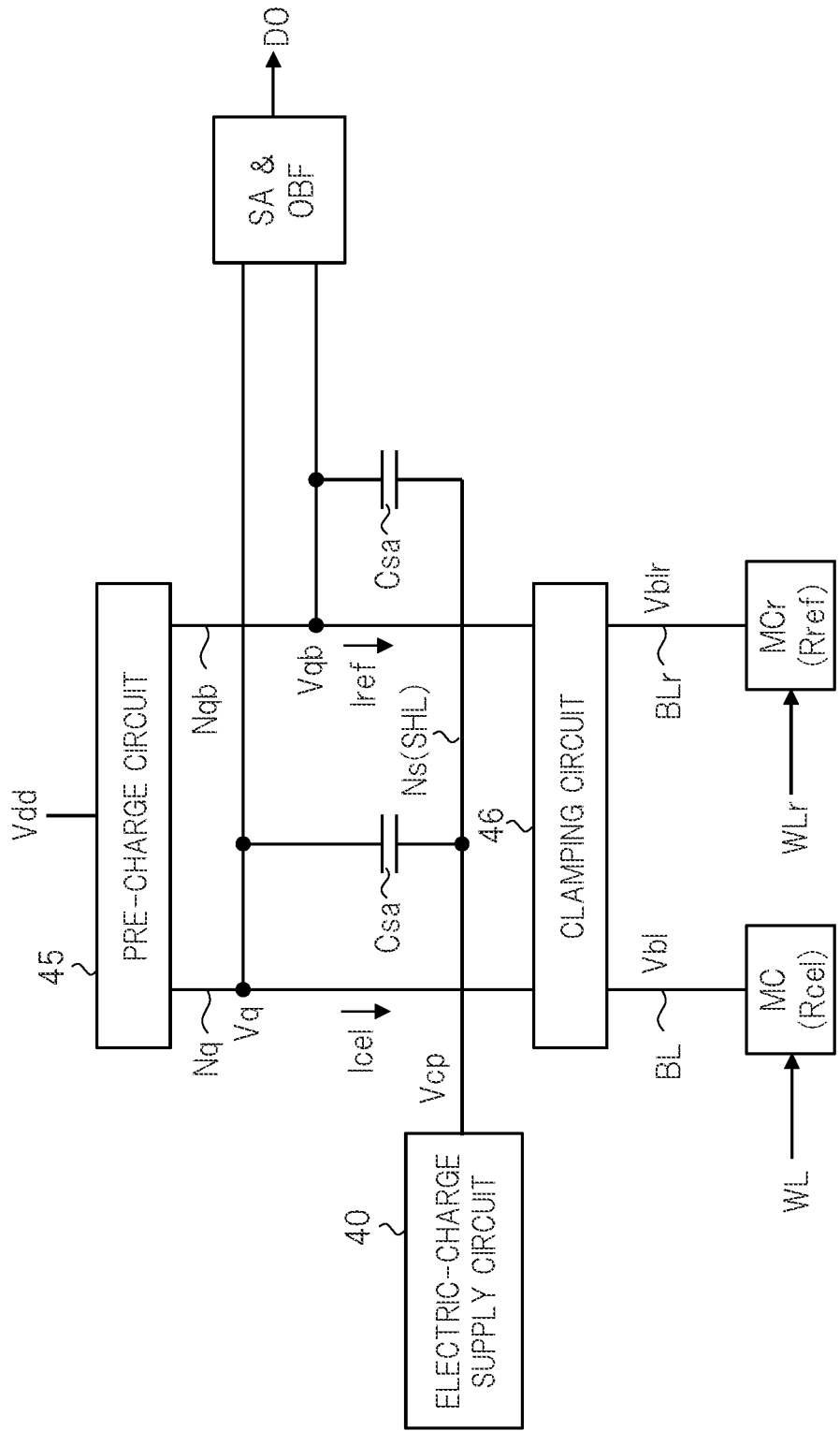
FIG. 5 is a block diagram of an exemplary configuration of a principal part of a readout circuit in the nonvolatile memory illustrated in FIG. 2A.

FIG. 5 is a block diagram of an exemplary configuration of a principal part of a readout circuit in the nonvolatile memory illustrated in FIG. 2A. The readout circuit illustrated in FIG. 5 includes an electric-charge supply circuit 40, a pre-charge circuit 45, a clamping circuit 46, a memory cell MC, a reference memory cell MCr, a sense amplifier SA, and an output buffer OBF. The memory cell MC is connected to a word line WL and a bit line BL, and includes a resistive random access memory element Rcel. The reference memory cell MCr is connected to a reference word line WLr and a reference bit line BLr, and includes a reference resistive element Rref.

The clamping circuit 46 applies the readout potential that is the fixed potential to the memory element Rcel and the reference resistive element Rref, respectively, through the bit line BL and the reference bit line BLr. Although not illustrated, a column selector CSEL is connected between the clamping circuit 46 and the memory cell MC. The reference memory cell MCr is disposed in either the memory array 30 or the readout circuit. The cell current Icel is flown through the node (first wiring) Nq by the application of the readout potential to the memory element Rcel. The reference current Iref is flown through the node (second wiring) Nqb by the application of the readout potential to the reference resistive element Rref.

The pre-charge circuit 45 pre-charges the node Nq and the node Nqb to power-source potential Vdd. After the pre-charging made by the pre-charge circuit 45, the sense amplifier SA amplifies the potential difference between the potential Vq of the node Nq and the potential Vqb of the node Nqb generated after the discharge period based on the cell current Icel and the reference current Iref. The output buffer OBF outputs the readout data DO provided by further amplifying the potential difference having been amplified by the sense amplifier SA to the power-source potential Vdd and latching a result of the amplification.

A node Ns is coupled to, for example, each of the node Nq and the node Nqb through the capacitor Csa that is the parasitic capacitance. The node Ns is, for example, a shielded line (third wiring) SHL. The electric-charge supply circuit 40 is connected to the node Ns, and supplies electric charge to the node Ns in the discharge period. In other words, the electric-charge supply circuit 40 rises the potentials Vq and Vqb of the nodes Nq and Nqb by charging the node Ns.

Figure 6A:
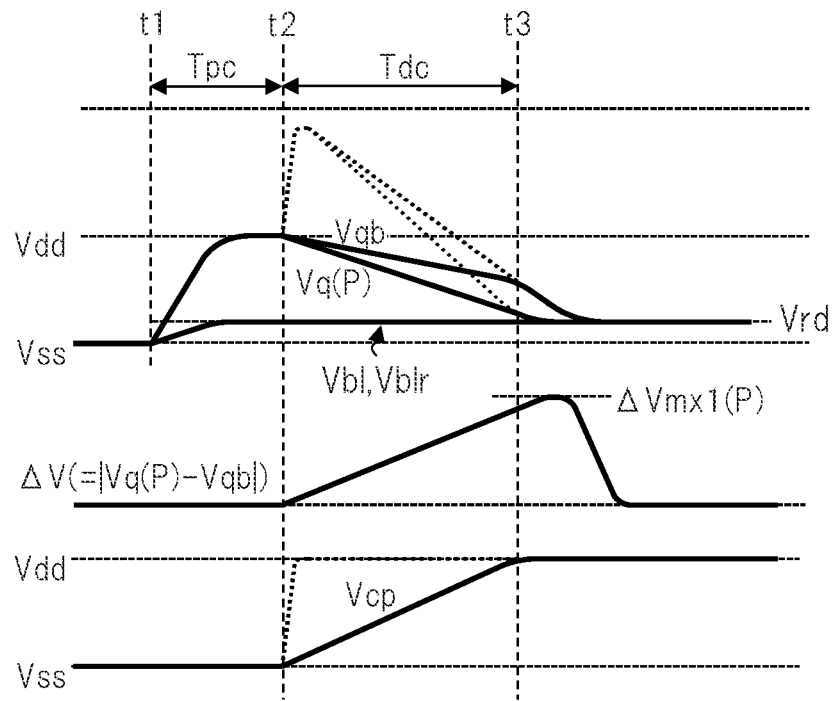
FIG. 6A is a waveform chart of an exemplary operation at the time of readout of a memory element of a "P" state in the readout circuit illustrated in FIG. 5.
Figure 6B:
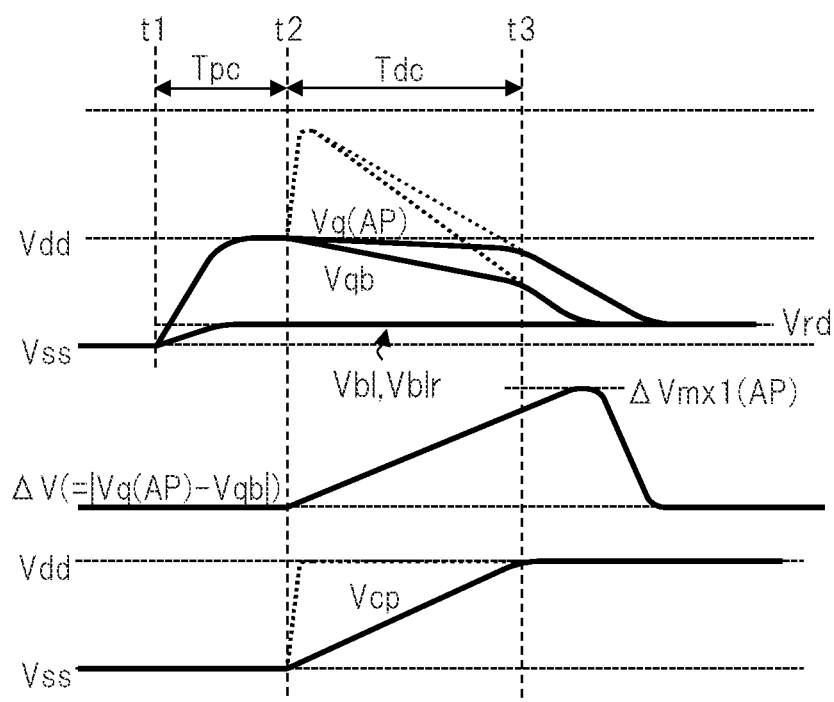
FIG. 6B is a waveform chart of an exemplary operation at the time of readout of a memory element of an "AP" state in the readout circuit illustrated in FIG. 5.

FIG. 6A is a waveform chart of an exemplary operation at the time of readout of the memory element in the P state in the readout circuit illustrated in FIG. 5. FIG. 6B is a waveform chart of an exemplary operation at the time of readout of the memory element in the AP state in the readout circuit illustrated in FIG. 5. FIGS. 6A and 6B illustrate the exemplary operations similar to that in FIG. 4B.

In the pre-charge period Tpc from time t1 to time t2, the pre-charge circuit 45 pre-charges the nodes Nq and Nqb to the power-source potential Vdd. The memory element Rcel in the memory cell MC and the reference resistive element Rref in the reference memory cell MCr are each brought into a selected state. The clamping circuit 46 clamps the potential Vbl of the bit line BL and the potential Vblr of the reference bit line BLr both at the readout potential Vrd. Accordingly, the cell current Icel and the reference current Iref flow through the node Nq and the node Nqb, respectively.

Subsequently, the pre-charge circuit 45 is stopped at time t2. In the discharge period Tdc from time t2 to time t3, by the discharge based on the cell current Icel and the reference current Iref, the potential Vq of the node Nq and the potential Vqb of the node Nqb gradually decrease from the power-source potential Vdd. In this case, a condition "Icel>Iref" is satisfied for the readout of the memory element Rcel in the P state, namely, in the low resistance state, while a condition "Icel<Iref" is satisfied for the readout of the memory element Rcel in the AP state, namely, in the high resistance state.

As a result, in the case of FIG. 6A corresponding to the P state, the discharge gradient of the potential Vq(P) is larger than the discharge gradient of the potential Vqb. In the case of FIG. 6B corresponding to the AP state, the discharge gradient of the potential Vq(AP) is smaller than the discharge gradient of the potential Vqb. Then, in accordance with the difference between the discharge gradients, the potential difference ΔV between the potential Vq and the potential Vqb increases in a time course.

Meanwhile, during the discharge period Tdc, the electric-charge supply circuit 40 changes the potential Vcp of the node Ns from ground potential Vss to the power-source potential Vdd. Thus, the electric-charge supply circuit 40 applies the same offset amount to the discharge gradient of the potential Vq and the discharge gradient of the potential Vqb in the discharge period Tdc, and makes both of the discharge gradients gentle by the same amount.

As a result, while the rise gradient of the potential difference ΔV is kept as similar to that in FIG. 15B, time taken until either the potential Vq or the potential Vqb reaches nearly the readout potential Vrd, namely, the discharge period Tdc can be made longer than that in FIG. Thus, as illustrated in FIGS. 6A and 6B, the maximum values ΔVmx1(P) and ΔVmx1(AP) of the potential difference ΔV can be increased. Note that the sense amplifier SA is activated at, for example, time t3 at which the potential Vcp of the node Ns reaches the power-source potential Vdd.

Figure 7:
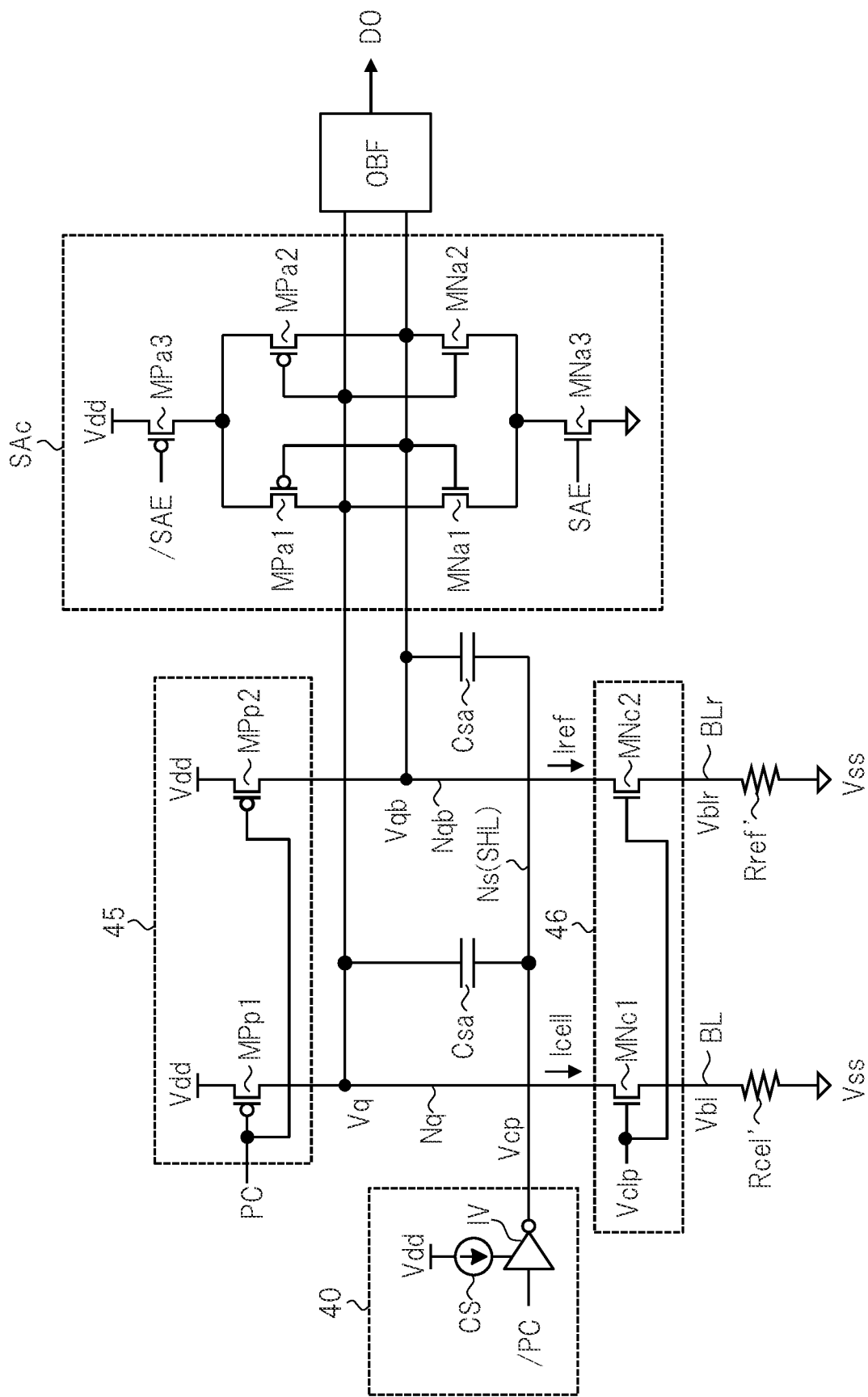
FIG. 7 is a circuit diagram of an exemplary detailed configuration of the readout circuit illustrated in FIG. 5.

FIG. 7 is a circuit diagram of an exemplary detailed configuration of the readout circuit illustrated in FIG. 5. In FIG. 7, as similar to the case of FIG. 14, a pre-charge circuit 45 includes two pMOS transistors MPp1 and MPp2, and a clamping circuit 46 includes two nMOS transistors MNc1 and MNc2. As similar to the case of FIG. 14, a sense amplifier SAc also includes one pMOS transistor MPa3 and two pMOS transistors MPa1 and MPa2. A p-channel transistor pair of the two pMOS transistors MPa1 and MPa2 performs differential amplification in cross-coupled connection.

However, as different from the case of FIG. 14, the sense amplifier SAc further includes one nMOS transistor MNa3 and two nMOS transistors MNa1 and MNa2. A node Nqb is connected to the gate of the nMOS transistor MNa1 and the drain of the nMOS transistor MNa2. A node Nq is connected to the gate of the nMOS transistor MNa2 and the drain of the nMOS transistor MNa1. As described above, an n-channel transistor pair of the two nMOS transistors MNa1 and MNa2 also performs differential amplification in cross-coupled connection. That is, the sense amplifier SAc is of a CMOS cross-coupled type.

The nMOS transistor MNa3 applies ground potential Vss to sources of the nMOS transistors MNa1 and MNa2 in the high-level period of a sense-amplifier enable signal SAE. Simultaneously, the pMOS transistor MPa3 applies power-source potential Vdd to sources of the pMOS transistors MPa1 and MPa2 in the high-level period of the sense-amplifier enable signal SAE. Thus, the sense amplifier SAc is activated.

In this example, an electric-charge supply circuit 40 includes a current source CS connected to the power-source potential Vdd, and an inverter circuit IV. In a high-level period of a pre-charge signal PC, namely, in a non-activation period of the pre-charge circuit 45, the inverter circuit IV charges, for example, a node Ns through a switch element on the high-potential side that is a pMOS transistor by using current from the current source CS. That is, the current source CS determines the rate of charging at the time of charging of the node Ns, namely, the rise gradient of the potential Vcp as in FIG. 6A or others. On the other hand, in a low-level period of the pre-charge signal PC, namely, in an activation period of the pre-charge circuit 45, the inverter circuit IV discharges, for example, the node Ns to the ground potential Vss through a switch element on the low-potential side that is an nMOS transistor.

As illustrated in FIGS. 6A and 6B, at time t3 at which the sense amplifier SA is activated, the potential Vq(P) is lower than the potential Vqb, and the potential Vq(AP) is higher than the potential Vqb. That is, the input range of the sense amplifier SA vary depending on either the P state or the AP state. Thus, in the exemplary configuration of FIG. 7, the sense amplifier SAc of a CMOS cross-coupled type is used. The current value of the current source CS is desirably about "(Icel+Iref)×0.9". Note that the value of cell current Icel varies between the P state and the AP state. Thus, for commonly handling both of the P state and the AP state, the current value of the current source CS may be set to about "Iref×1.6".

FIG. 8 is a timing chart of an exemplary operation in a readout cycle in FIGS. 2A and 7. Herein, for example, a detailed description of overlap with FIG. 6A will be omitted. In FIG. 8, the pre-charge signal PC and the sense-amplifier enable signal SAE are both controlled to be at low level in the period before time t0. Accordingly, the pre-charge circuit 45 is in the activation state, and pre-charges the potential Vq and the potential Vqb to the power-source potential Vdd. The sense amplifier SAc is in the non-activation state.

At time t0, a word line WL and a reference word line WLr are activated. After that, at time t2, the pre-charge signal PC is controlled to change from low level to high level. Thus, the pre-charge circuit 45 is brought into the non-activation state. Between time t0 and time t2, the bit line BL and the reference bit line BLr are connected, respectively to the node Nq and the node Nqb through a column selector CSEL. Thus, from time t2 at which the pre-charge circuit is inactivated, the potential Vq and the potential Vqb gradually decrease from the power-source potential Vdd.

After that, at time t3, the sense-amplifier enable signal SAE is controlled to change from low level to high level. In response to this, the sense amplifier SAc starts the amplification operation to amplify one of the potential Vq and the potential Vqb to the power-source potential Vdd and amplify the other to the ground potential Vss. After that, at time t4, the word line WL and the reference word line WLr are inactivated. The pre-charge signal PC and the sense-amplifier enable signal SAE are controlled to change from high level to low level. In response to this, the pre-charge circuit 45 is brought into the activation state, and the sense amplifier SAc is brought into the non-activation state. The electric-charge supply circuit 40 changes the potential Vcp from the power-source potential Vdd to the ground potential Vss.

In the example of FIG. 8, note that the period from time t3 to time t4 corresponds to the activation period Tsae of the sense amplifier SAc. The period from time t4 in certain readout cycle to time t2 in the next readout cycle corresponds to a pre-charge period Tpc.

(Detail of Shielded Line)

Figure 9A:
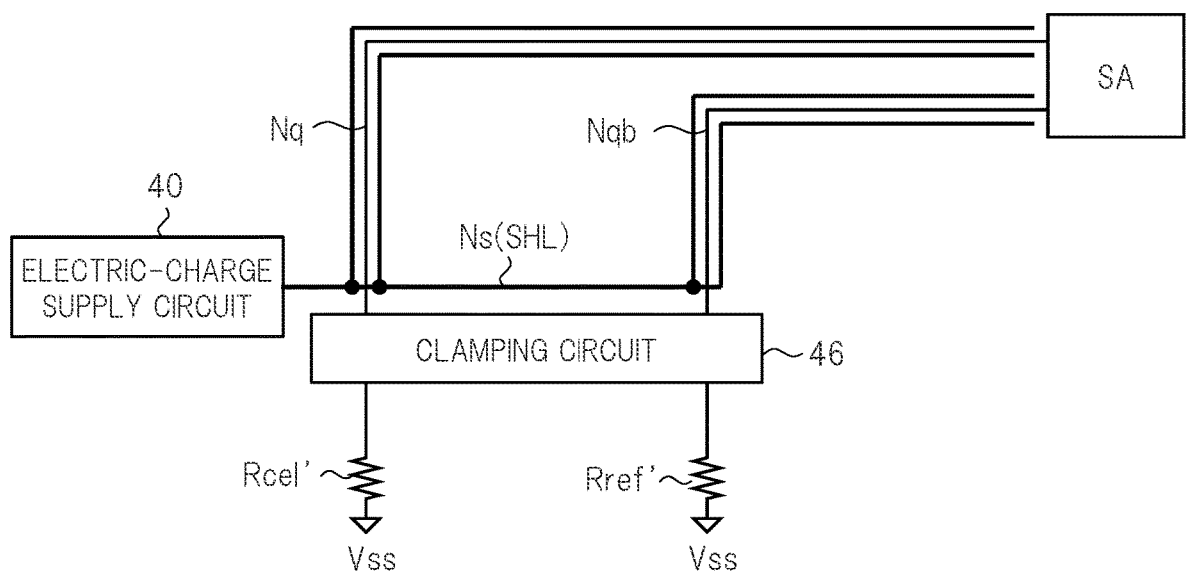
FIG. 9A is a schematic view of an exemplary detailed configuration of a shielded line as a connection with an electric-charge supply circuit in FIG. 5.
Figure 9B:
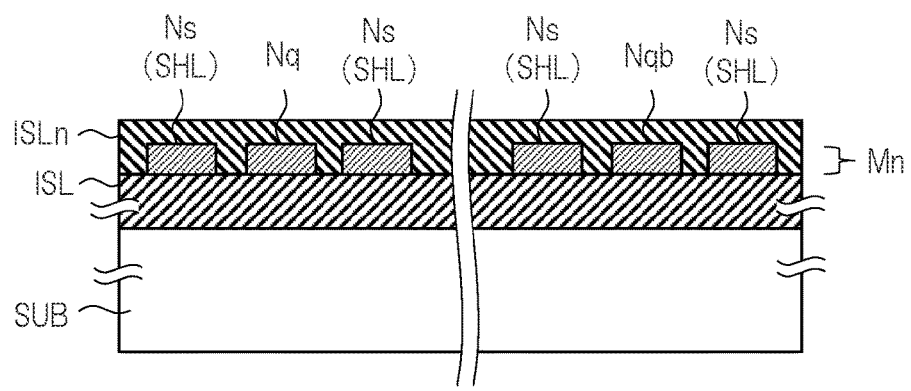
FIG. 9B is a cross-sectional view of an exemplary device structure for the shielded line in FIG. 9A.

FIG. 9A is a schematic view of an exemplary detailed configuration of a shielded line that is destination of a connection of the electric-charge supply circuit in FIG. 5. FIG. 9B is a cross-sectional view of an exemplary device structure of the shielded line in FIG. 9A. As illustrated in FIG. 9A, the sense amplifier SA amplifies the potential difference between the potential of the node (first wiring) Nq and the potential of the node (second wiring) Nqb. In this case, it is necessary to reduce noises of an input to the sense amplifier SA.

Thus, as illustrated in FIG. 9A, in some cases, the node Nq and the node Nqb are each provided with a shielded line SHL corresponding to the node Ns. The shielded line SHL is disposed adjacently to each of the node Nq and the node Nqb, and has a section extending in parallel to the node (first wiring) Nq and a section extending in parallel to the node (second wiring) Nqb. Thus, such a capacitor Csa as illustrated in FIG. 5, more specifically a parasitic capacitance is formed between the node Nq and the shielded line SHL and between the node Nqb and the shielded line SHL.

As illustrated in FIG. 15A, the shielded line SHL is typically connected to the ground potential Vss. Meanwhile, in the exemplary configuration of FIG. 9A, destination of connection of the shielded line SHL is not the ground potential Vss but the electric-charge supply circuit By use of the shielded line SHL that may be typically provided as described above, for example, design for achievement of the system according to the embodiment can be simplified, and area overhead can be reduced. Because the potential Vcp is applied to the shielded line SHL, the effect of reduction in the noises of the input to the sense amplifier SA can be sufficiently provided.

In the example of FIG. 9B, the n-th metal wiring layer Mn and the n-th insulating layer ISLn are provided through an insulating layer ISL on a semiconductor substrate SUB. The node (first wiring) Nq, the node (second wiring) Nqb, and a plurality of the shielded lines SHL are formed in the metal wiring layer Mn. In the planar direction of the semiconductor substrate SUB, the shielded line SHL is disposed on both sides of the node (first wiring) Nq and on both sides of the node (second wiring) Nqb.

Main Effect According to First Embodiment

As described above, in the system according to the first embodiment, because of the provision of the electric-charge supply circuit 40, the potential difference to be input to the sense amplifier SA can be increased, and the readout margin can be increased. Furthermore, in this case, the readout margin can be increased without the application of the power-source potential Vdd that is high to the transistor, and thus, without the increase in the breakdown voltage of the transistor. This result contributes to the miniaturization of the semiconductor device 10.

Second Embodiment (Detail of Readout Circuit)

Figure 10:
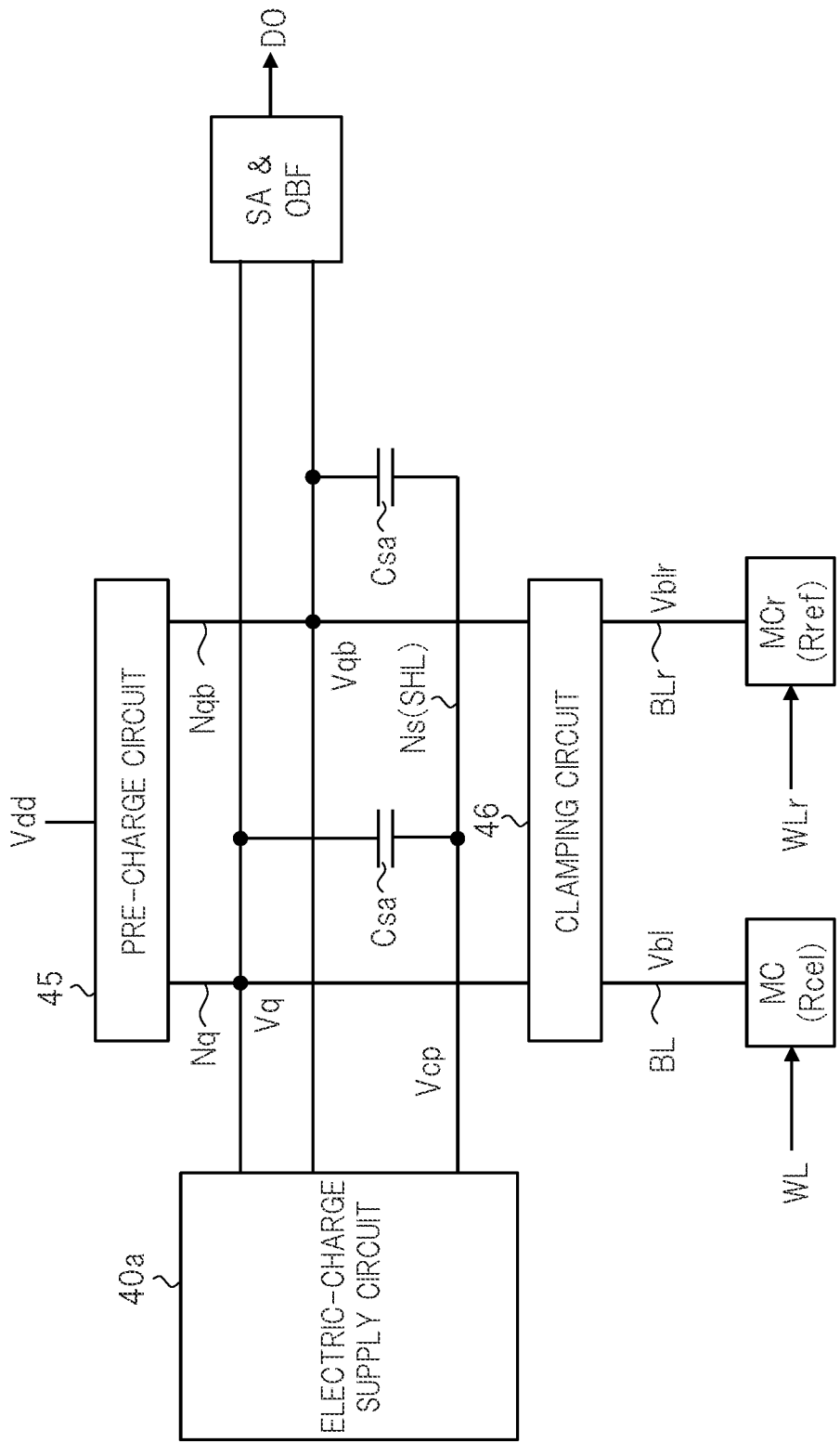
FIG. 10 is a block diagram of an exemplary configuration of a principal part of a readout circuit in a nonvolatile memory as illustrated in FIG. 2A in a semiconductor device according to a second embodiment.

FIG. 10 is a block diagram of an exemplary configuration of a principal part of a readout circuit in such a nonvolatile memory as illustrated in FIG. 2A in a semiconductor device according to a second embodiment. The readout circuit illustrated in FIG. 10 is different from the readout circuit illustrated in FIG. 5 in terms of a configuration of an electric-charge supply circuit 40a. As different from the case of FIG. 5, the electric-charge supply circuit 40a is connected to a node (first wiring) Nq and a node (second wiring) Nqb.

Briefly, when the potential Vq of the node Nq or the potential Vqb of the node Nqb reaches target potential, the electric-charge supply circuit 40a starts to supply the electric charge to the node Ns that is the shielded line SHL. The electric-charge supply circuit 40a includes a negative feedback circuit that increases the supply of the electric charge to the node Ns to suppress the decrease of the potential Vq or the potential Vqb.

Figure 11A:
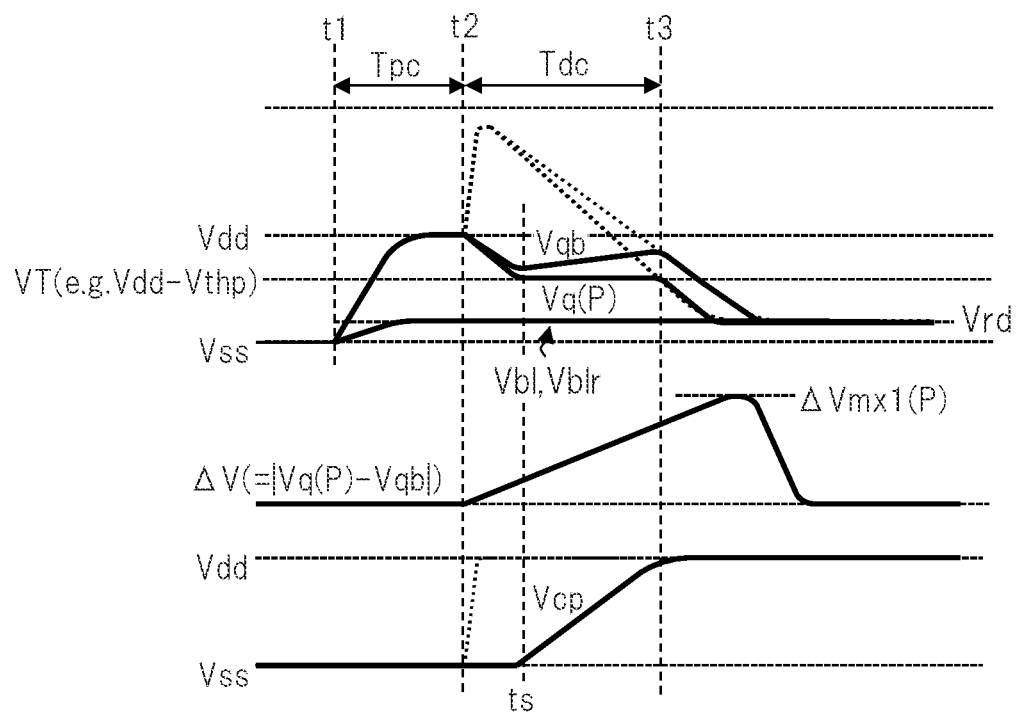
FIG. 11A is a waveform chart of an exemplary operation at the time of readout of a memory element of a P state in the readout circuit illustrated in FIG. 10.
Figure 11B:
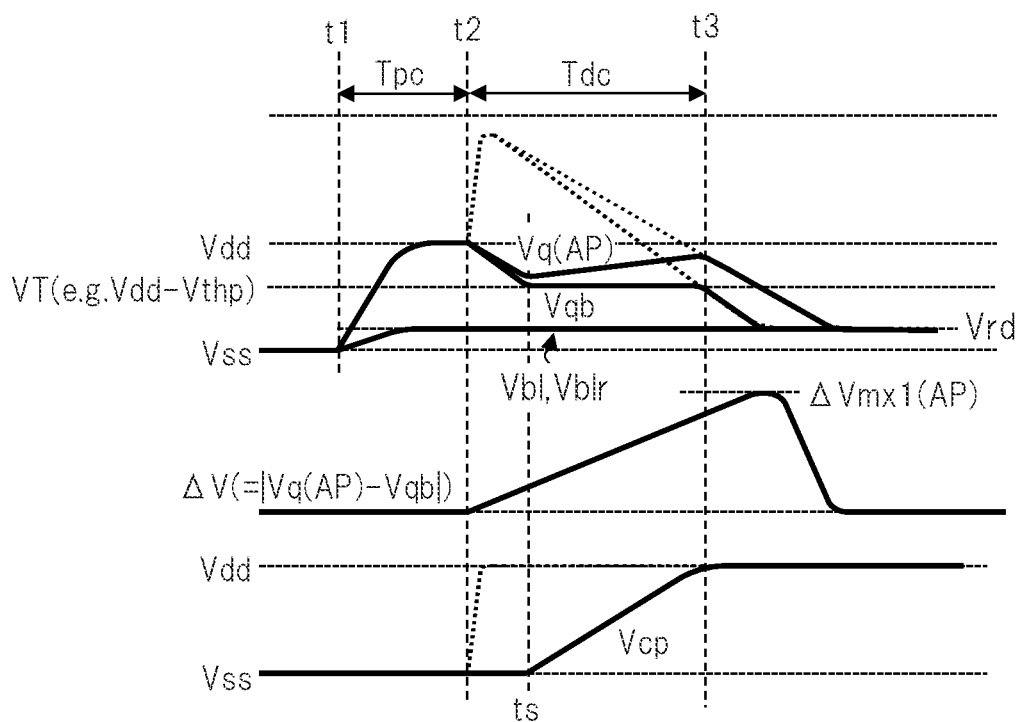
FIG. 11B is a waveform chart of an exemplary operation at the time of readout of the memory element of an AP state in the readout circuit illustrated in FIG. 10.

FIG. 11A is a waveform chart of an exemplary operation at the time of readout of the memory element in the P state by the readout circuit illustrated in FIG. 10. FIG. 11B is a waveform chart of an exemplary operation at the time of readout of the memory element in the AP state by the readout circuit illustrated in FIG. 10. FIGS. 11A and 11B illustrate the same exemplary operations as those in FIGS. 6A and 6B except for the following points.

The electric-charge supply circuit 40a starts to charge the node Ns at time "ts" in the case of FIG. 11A at which the potential Vq(P) reaches the target potential VT or at time "ts" in the case of FIG. 11B at which the potential Vqb reaches the target potential VT, and rises the potential Vcp of the node Ns from ground potential Vss. After that, because of the operation of the negative feedback circuit described above, the electric-charge supply circuit 40a increases the charge amount to the node Ns to suppress the decrease of the potential Vq(P) and the potential Vqb in the case of FIG. 11A or the potential Vqb and the potential Vq(AP) in the case of FIG. 11B.

Thus, in the case of FIG. 11A, the potential difference ΔV between the potential Vq(P) and the potential Vqb increases in a time course in the state in which the potential Vq(P) is maintained at almost the target potential VT. Similarly, in the case of FIG. 11B, the potential difference ΔV between the potential Vq(AP) and the potential Vqb increases in a time course in the state in which the potential Vqb is maintained at almost the target potential VT. Then, at time t3, the potential Vcp of the node Ns reaches almost power-source potential Vdd. The sense amplifier SA is activated at, for example, this time t3.

In the cases of FIGS. 6A and 6B described above, the input range of the sense amplifier SA varies depending on either the P state or the AP state. Thus, as illustrated in FIG. 7, the CMOS cross-coupled type of sense amplifier SA is required. On the other hand, in the cases of FIGS. 11A and 11B, the input range of the sense amplifier SA is almost constant regardless of either the P state or the AP state. Thus, the sense amplifier SA may be of, for example, the pMOS cross-coupled type. As a result, for example, the circuit area can be reduced.

Figure 12:
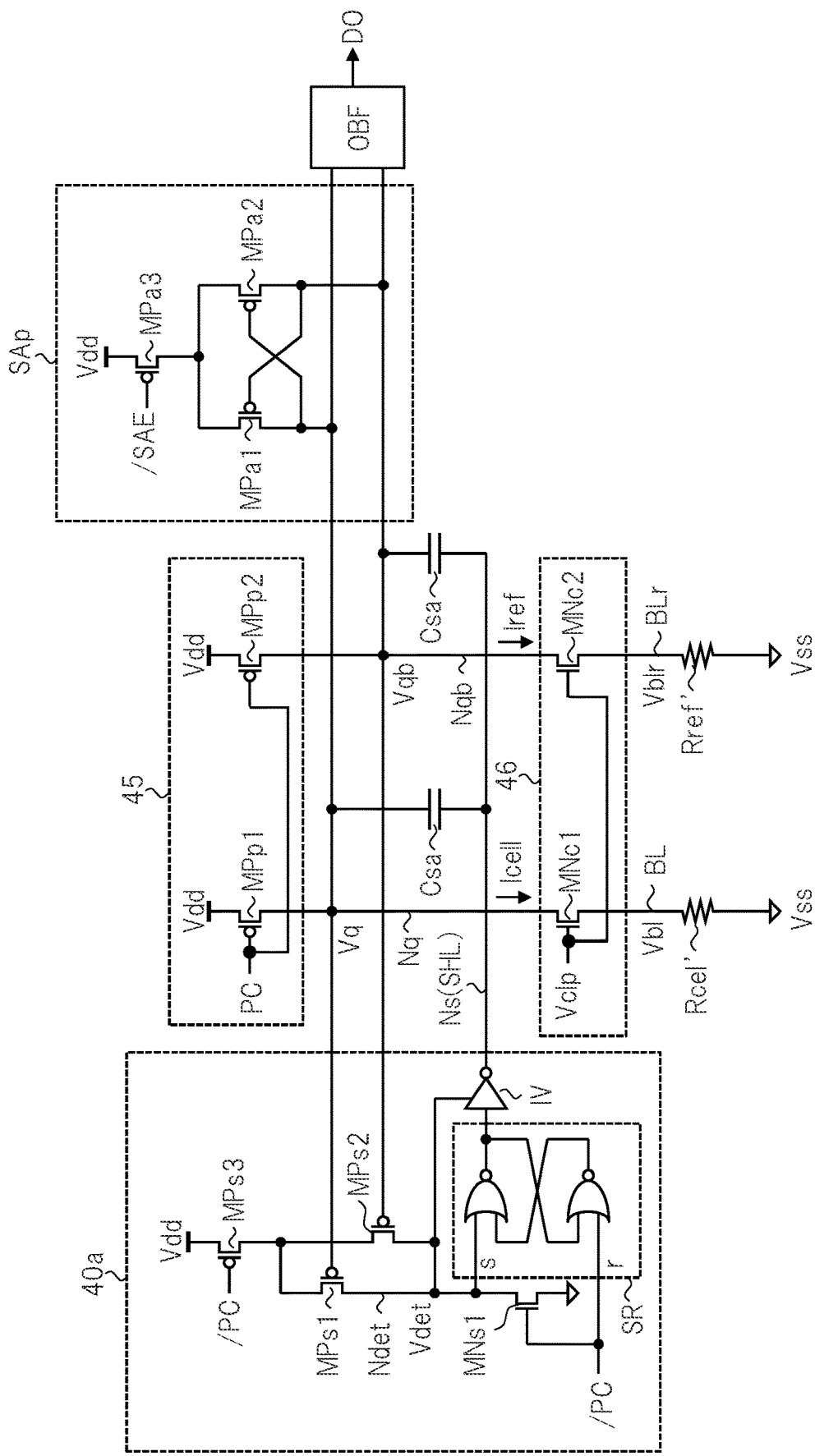
FIG. 12 is a circuit diagram of an exemplary detailed configuration of the readout circuit illustrated in FIG. 10.

FIG. 12 is a circuit diagram of an exemplary detailed configuration of the readout circuit illustrated in FIG. 10. The exemplary configuration illustrated in FIG. 12 is different from the exemplary configuration illustrated in FIG. 7 in terms of the following two points. As the first difference, the sense amplifier SAp is of not the CMOS cross-coupled type as illustrated in FIG. 7 but the pMOS cross-coupled type. As the second difference, the electric-charge supply circuit includes two pMOS transistors MPs1 and MPs2, one pMOS transistor MPs3, one nMOS transistor MNs1, and a set-reset latch circuit SR, in addition to an inverter circuit IV similar to that in FIG. 7.

The pMOS transistor (first transistor) MPs1 is connected to a node Nq, and makes the current flow therethrough that increases in accordance with the decrease amount of the potential Vq of the node Nq. The pMOS transistor (second transistor) MPs2 is connected to a node Nqb, and makes the current flow therethrough that increases in accordance with the decrease amount of the potential Vqb of the node Nqb. The pMOS transistor MPs3 is turned ON in the high-level period of the pre-charge signal PC, and applies power-source potential Vdd to the sources of the pMOS transistors MPs1 and MPs2.

Specifically, the pMOS transistor MPs1 has its gate to which the potential Vq is applied, is turned ON when the potential Vq is lower than "Vdd−Vthp", and makes the current flow therethrough that increases in accordance with the decrease amount of the potential Vq. On the other hand, the pMOS transistor MPs2 has its gate to which the potential Vqb is applied, is turned ON when the potential Vqb is lower than "Vdd−Vthp", and makes the current flow therethrough that increases in accordance with the decrease amount of the potential Vqb. The term "Vthp" represents threshold voltage for the pMOS transistors MPs1 and MPs2. In this case, the term "Vdd−Vthp" corresponds to the target potential VT in FIGS. 11A and 11B.

For example, through a switch element on the high-potential side that is a pMOS transistor, the inverter circuit IV charges a node Ns by using current resulting from addition of the current flowing through the pMOS transistor MPs1 and the current flowing through the pMOS transistor MPs2. The value of the current for charging in this case is, for example, almost equal to the value of addition of cell current Icel and reference current Iref. Then, the potential Vq and the potential Vqb rise in accordance with the charge amount to the node Ns. As a result, the switch element on the high-potential side in the inverter circuit IV and the pMOS transistors MPs1 and MPs2 configure a negative feedback circuit.

The set-reset latch circuit SR controls the input to the inverter circuit IV. The set-reset latch circuit SR operates while a node Ndet that is the drains of the pMOS transistors MPs1 and MPs2 is used as its set input. When the potential Vdet of the node Ndet is at a high level, that is, when the pMOS transistors MPs1 and MPs2 are turned ON, the set-reset latch circuit SR performs control for turning ON the switch element on the high-potential side in the inverter circuit IV.

Also, the set-reset latch circuit SR operates while an inversion signal of the pre-charge signal PC is used as its reset input. When the pre-charge signal PC is at a low level, in other words, when the pre-charge circuit 45 is in the activation state, the set-reset latch circuit SR performs control for turning ON the switch element on the low-potential side such as an nMOS transistor in the inverter circuit IV to discharge the node Ns to ground potential Vss.

In the low-level period of the pre-charge signal PC, the nMOS transistor MNs1 fixes the potential Vdet of the node Ndet to the low level. On the other hand, the nMOS transistor MNs1 is turned OFF in the high-level period of the pre-charge signal PC, namely, the non-activation period of the pre-charge circuit 45, in other words, the discharge period of the node Nq and the node Nqb. As a result, the respective currents flowing through the pMOS transistors MPs1 and MPs2 are supplied to the inverter circuit IV.

Figure 13:
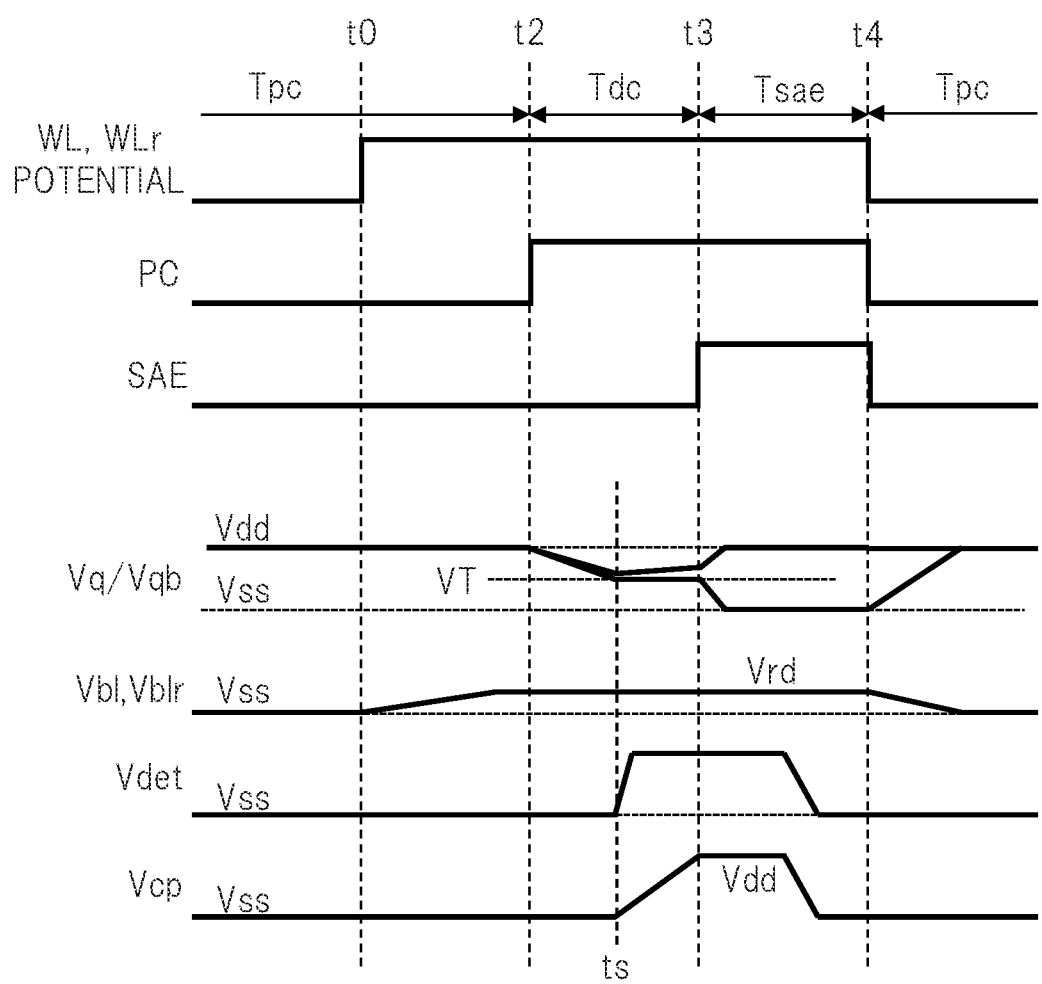
FIG. 13 is a timing chart of an exemplary operation in a readout cycle in FIGS. 2A and 12.

FIG. 13 is a timing chart of an exemplary operation in a readout cycle in FIGS. 2A and 12. FIG. 13 illustrates the same exemplary operation as that of FIG. 8 except for the following points. That is, in FIG. 13, at time is at which the potential Vq or the potential Vqb reaches the target potential VT in the discharge period Tdc, the potential Vdet of the node Ndet changes from low level to high level. In response to this, the electric-charge supply circuit 40a rises the potential Vcp of the node Ns to suppress the decrease of the potential Vq or the potential Vqb. As a result, either the potential Vq or the potential Vqb is maintained at almost the target potential VT until time t3 at which the sense-amplifier enable signal SAE changes to high level.

Main Effect According to Second Embodiment

Even by use of the system according to the second embodiment as described above, effects similar to the various effects described in the first embodiment can be provided. Furthermore, since the system according to the second embodiment is provided with the electric-charge supply circuit 40a including the negative feedback circuit, the sense amplifier SA is unnecessary to be provided with the pair of nMOS cross-coupled type transistors, and can be made of the pair of pMOS cross-coupled type transistors. As a result, for example, the circuit area can be reduced.

In the foregoing, the invention made by the inventors of the present application has been concretely described on the basis of the embodiments. However, it is needless to say that the present invention is not limited to the foregoing embodiments, and various modifications can be made within the scope of the present invention.

What is claimed is:

1. A semiconductor device comprising:
    a memory cell including a resistive random access memory element;
    a reference resistive element;
    a clamping circuit configured to apply a fixed potential to each of the memory element and the reference resistive element;
    a first wiring through which a cell current that is generated by application of the fixed potential to the memory element flows;
    a second wiring through which a reference current that is generated by application of the fixed potential to the reference resistive element flows;
    a pre-charge circuit configured to pre-charge the first wiring and the second wiring to a power-source potential;
    a sense amplifier configured to amplify a potential difference between a potential of the first wiring and a potential of the second wiring generated after a discharge period based on the cell current and the reference current after the pre-charging made by the pre-charge circuit;
    a third wiring coupled to each of the first wiring and the second wiring through a capacitor; and
    an electric-charge supply circuit connected to the third wiring and configured to supply electric charge to the third wiring in the discharge period, and
    wherein the electric-charge supply circuit is configured to charge the third wiring from a lower power-source potential to a higher power-source potential during the discharge period.

2. The semiconductor device according to claim 1, wherein the electric-charge supply circuit includes:
    a switch element configured to charge the third wiring when the switch element is controlled to be turned ON; and
    a current source configured to determine a rate of charging in charging the third wiring.

3. The semiconductor device according to claim 1, wherein the sense amplifier includes:
    a first-conductive transistor pair configured to perform differential amplification in cross-coupled connection; and
    a second-conductive transistor pair configured to perform differential amplification in cross-coupled connection.

4. The semiconductor device according to claim 1, wherein the third wiring is a shielded line disposed adjacently to each of the first wiring and the second wiring, and has a section extending in parallel to the first wiring and a section extending in parallel to the second wiring.

5. The semiconductor device according to claim 1, wherein the electric-charge supply circuit is further connected to the first wiring and the second wiring, and is configured to start to operate supply of electric charge to the third wiring when the potential of the first wiring or the potential of the second wiring reaches a target potential.

6. The semiconductor device according to claim 5, wherein the electric-charge supply circuit includes a negative feedback circuit configured to increase an amount of the supply of the electric charge to the third wiring to suppress decrease of the potential of the first wiring or the potential of the second wiring.

7. The semiconductor device according to claim 6, wherein the electric-charge supply circuit includes:
    a first transistor connected to the first wiring, and configured to make a current flow that increases in accordance with an amount of the decrease of the potential of the first wiring;
    a second transistor connected to the second wiring, and configured to make a current flow that increases in accordance with an amount of the decrease of the potential of the second wiring; and
    a switch element configured to, when being controlled to be turned ON, charge the third wiring by using a current resulting from addition of the current flowing through the first transistor and the current flowing through the second transistor.

8. The semiconductor device according to claim 6, wherein the sense amplifier includes a first-conductive transistor pair configured to perform differential amplification in cross-coupled connection.

9. A semiconductor device including a single semiconductor chip, the semiconductor device comprising:
a processor;
a nonvolatile memory; and
a bus connecting the processor and the nonvolatile memory,
wherein the nonvolatile memory includes:
a memory cell including a resistive random access memory element;
a reference resistive element;
a clamping circuit configured to apply a fixed potential to each of the memory element and the reference resistive element;
a first wiring through which a cell current that is generated by application of the fixed potential to the memory element flows;
a second wiring through which a reference current that is generated by application of the fixed potential to the reference resistive element flows;
a pre-charge circuit configured to pre-charge the first wiring and the second wiring to a power-source potential;
a sense amplifier configured to amplify a potential difference between a potential of the first wiring and a potential of the second wiring generated after a discharge period based on the cell current and the reference current after the pre-charging made by the pre-charge circuit;
a third wiring coupled to each of the first wiring and the second wiring through a capacitor; and
an electric-charge supply circuit connected to the third wiring, and configured to supply electric charge to the third wiring in the discharge period, and
wherein the electric-charge supply circuit charges the third wiring from a lower power-source potential to a higher power-source potential during the discharge period.

10. The semiconductor device according to claim 9, wherein the electric-charge supply circuit includes:
a switch element configured to charge the third wiring when being controlled to be turned ON; and
a current source configured to determine a rate of charging in charging the third wiring.

11. The semiconductor device according to claim 9, wherein the third wiring is a shielded line disposed adjacently to each of the first wiring and the second wiring, and has a section extending in parallel to the first wiring and a section extending in parallel to the second wiring.

12. The semiconductor device according to claim 9, wherein the electric-charge supply circuit is further connected to the first wiring and the second wiring, and is configured to start to operate supply of electric charge to the third wiring when the potential of the first wiring or the potential of the second wiring reaches a target potential.

13. The semiconductor device according to claim 12, wherein the electric-charge supply circuit includes a negative feedback circuit configured to increase an amount of the supply of the electric charge to the third wiring to suppress decrease of the potential of the first wiring or the potential of the second wiring.

* * * * *